US009652964B2

(12) United States Patent
Kang et al.

(10) Patent No.: US 9,652,964 B2
(45) Date of Patent: May 16, 2017

(54) NOTIFICATION METHOD AND ELECTRONIC DEVICE

(71) Applicant: Samsung Electronics Co., Ltd., Suwon-si, Gyeonggi-do (KR)

(72) Inventors: Doo-Suk Kang, Suwon-si (KR); Geon-Soo Kim, Suwon-si (KR); Yong-Joon Jeon, Hwaseong-si (KR); Bo-Kun Choi, Seoul (KR); Dong-Hyun Yeom, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 14/625,094

(22) Filed: Feb. 18, 2015

(65) Prior Publication Data

US 2015/0243150 A1 Aug. 27, 2015

(30) Foreign Application Priority Data

Feb. 21, 2014 (KR) ........................ 10-2014-0020970

(51) Int. Cl.
| *G01W 1/00* | (2006.01) |
| *G08B 21/10* | (2006.01) |
| *G06Q 10/00* | (2012.01) |
| *G08B 5/36* | (2006.01) |

(52) U.S. Cl.
CPC ............. *G08B 21/10* (2013.01); *G06Q 10/00* (2013.01); *G08B 5/36* (2013.01)

(58) Field of Classification Search
CPC ..... H04W 4/021; H04W 4/22; H04W 76/007; G08B 21/24; G08B 21/10; G08B 5/36; G08B 21/18; G08B 17/00; G08B 25/005; G08B 25/016; G08B 17/10; G08B 21/182; G08B 21/0438; G06Q 10/00; G01W 1/00; G01W 1/02; G01W 1/06; H04L 12/1895; G08G 1/162; H04M 1/72519

USPC ....... 340/601, 539.11, 3.1, 506, 905, 539.26, 340/539.27, 539.28, 539.22, 540; 455/404.1

See application file for complete search history.

(56) References Cited

U.S. PATENT DOCUMENTS

| 7,084,775 B1* | 8/2006 | Smith ..................... G01W 1/00 340/601 |
| 8,242,902 B2* | 8/2012 | Oh ..................... H04L 12/1845 340/3.1 |
| 8,391,830 B1 | 3/2013 | Puliatti et al. |
| 2009/0033511 A1* | 2/2009 | Komiya ................. G08B 21/10 340/690 |

(Continued)

FOREIGN PATENT DOCUMENTS

| KR | 10-2007-0039453 A | 4/2007 |
| KR | 10-2011-0011345 A | 2/2011 |

(Continued)

*Primary Examiner* — Anh V La
(74) *Attorney, Agent, or Firm* — Jefferson IP Law, LLP

(57) ABSTRACT

An operation method and a device related to emergency situations are provided. A method for controlling an electronic device includes determining a designated situation, based on at least one piece of information obtained from outside the electronic device and information obtained from at least one sensor of the electronic device, determining features corresponding to the designated situation, and controlling the electronic device, based on at least one of the features and user status information.

25 Claims, 14 Drawing Sheets

(56) References Cited

U.S. PATENT DOCUMENTS

| | | |
|---|---|---|
| 2011/0096769 A1 | 4/2011 | Sim |
| 2013/0046847 A1 | 2/2013 | Zavesky |
| 2014/0089024 A1 | 3/2014 | Mason et al. |
| 2014/0203940 A1* | 7/2014 | Bonner ................ H04W 4/021 340/601 |
| 2014/0253326 A1* | 9/2014 | Cho ....................... H04W 4/22 340/539.13 |

FOREIGN PATENT DOCUMENTS

| | | |
|---|---|---|
| KR | 10-2012-0130427 A | 12/2012 |
| KR | 10-2013-0008109 A | 1/2013 |
| KR | 10-2013-0136311 A | 12/2013 |
| WO | 2012/160467 A1 | 11/2012 |

* cited by examiner

NOTIFICATION METHOD AND ELECTRONIC DEVICE

CROSS-REFERENCE TO RELATED APPLICATION(S)

This application claims the benefit under 35 U.S.C. §119(a) of a Korean patent application filed on Feb. 21, 2014 in the Korean Intellectual Property Office and assigned Serial number 10-2014-0020970, the entire disclosure of which is hereby incorporated by reference.

TECHNICAL FIELD

The present disclosure relates to an operation method and a device related to emergency situations.

BACKGROUND

Currently, many kinds of natural disasters, such as storms, earthquakes, and tsunamis occur due to the effects of climate change. As such, the frequency of natural disasters have increased. In addition to the natural disasters, emergency situations such as distress and/or traffic accidents also jeopardize the safety of individuals.

Some information on an occurring natural disaster may be provided from forecast companies, such as WeatherCast.

Currently, there is a user's demand for a service that detects a user in danger or in an emergency situation and provides emergency management. In order to protect life and assure safety in emergency situations, such as natural disasters, accidents, and distress, it is desired to recognize an emergency situation in advance and quickly inform other users of the emergency situation. However, most hazards or emergency situations, such as natural disasters, accidents, and distress are unpredictable by users.

Although services informing a user of information on natural disasters are provided by weathercast servers, these services are limited to providing simple information, and are likely do not differentiated from the typical weather report. Accordingly, since the existing disaster information services have a limited function of raising an alarm with simple disaster information, a user is forced to inconveniently search for detailed information and/or ask for help by himself in order to recognize the hazard or request help.

Accordingly, a means of determining a designated situation, based on at least one piece of information obtained from the outside or information obtained from at least one sensor that is functionally connected with an electronic device, determining features related to the designated situation and controlling the electronic device, based on at least one of the features or user status information is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

In accordance with an aspect of the present disclosure, a method for controlling an electronic device is provided. The method includes determining a designated situation, based on at least one piece of information obtained from outside the electronic device and information obtained from at least one sensor of the electronic device, determining features corresponding to the designated situation, and controlling the electronic device, based on at least one of the features and user status information.

In accordance with another aspect of the present disclosure, an electronic device is provided. The device includes a memory configured to store at least one piece of information related to functions of applications, and a controller configured to determine a designated situation, based on at least one piece of information obtained from outside the electronic device and information obtained from at least one sensor of the electronic device, to determine features corresponding to the designated situation, and to control the electronic device, based on at least one of the features or user status information.

In accordance with another aspect of the present disclosure, in a computer-readable recording medium for storing a program is provided. The medium includes a first instruction set programmed to determine a designated situation, based on at least one piece of information obtained from the outside the electronic device and information obtained from at least one sensor of the electronic device, a second instruction set programmed to determine features corresponding to the designated situation, and a third instruction set programmed to control the electronic device, based on at least one of the features and user status information.

In addition, the present disclosure may include various embodiments within the scope of the disclosure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
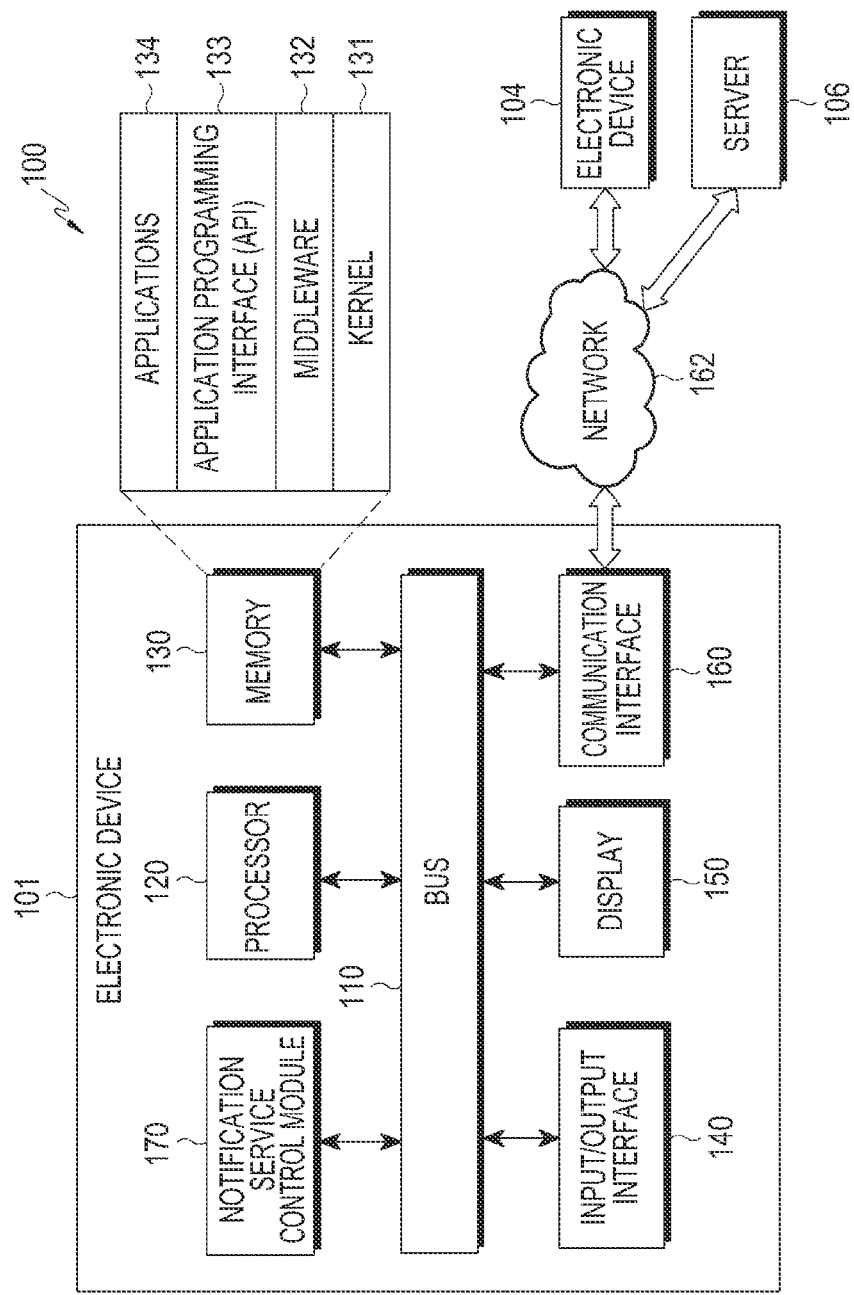
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween.

The terms used in the present disclosure are only used to describe specific embodiments, and are not intended to limit the present disclosure. Singular forms are intended to include plural forms unless the context clearly indicates otherwise.

Unless defined otherwise, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Electronic devices according to the present disclosure may adopt a notification service function. For example, the electronic devices may include at least one of smart phones, tablet Personal Computers (PCs), mobile phones, video phones, e-book readers, desktop PCs, laptop PCs, netbook computers, Personal Digital Assistants (PDAs), Portable Multimedia Players (PMPs), MP3 players, mobile medical devices, cameras, wearable devices (e.g., Head-Mounted-Devices (HMDs) such as electronic glasses), electronic clothes, electronic bracelets, electronic necklaces, electronic appcessories, electronic tattoos, or smart watches.

According to another embodiment, the electronic devices may be smart home appliances adopting a notification service function. The smart home appliances may include at least one of, for example, televisions, Digital Video Disk (DVD) players, audio players, refrigerators, air conditioners, cleaners, ovens, microwaves, washing machines, air purifiers, set-top boxes, TV boxes (e.g., Samsung HomeSync™, Apple TV™, or Google TV™), game consoles, electronic dictionaries, electronic keys, camcorders, or electronic frames.

According to another embodiment, the electronic devices may include at least one of various medical devices (e.g., a Magnetic Resonance Angiography (MRA), a Magnetic Resonance Imaging (MRI), a Computed Tomography (CT) machine, and an ultrasonic machine), navigation devices, Global Positioning System (GPS) receivers, Event Data Recorders (EDR), Flight Data Recorders (FDR), vehicle infotainment devices, electronic devices for ships (e.g., navigation devices for ships, and gyro-compasses), avionics, security devices, automotive head units, robots for home or industry, Automatic Teller Machines (ATMs) in banks, or Point Of Sale (POS) devices in shops.

According to another embodiment, the electronic devices may include at least one of furniture or a part of a building/structure having a notification service function, electronic boards, electronic signature receiving devices, projectors, or various measuring equipment (e.g., equipment for a water supply, electricity, natural gas or radio waves). Electronic devices according to the present disclosure may be one or more combinations of the above-described devices. In addition, electronic devices according to various embodiments of the present disclosure may be flexible devices. Further, it is obvious to those skilled in the art that electronic devices according to various embodiments of the present disclosure are not limited to the above-described devices.

Hereinafter, an electronic device according to various embodiments of the present disclosure will be described with reference to the accompanying drawings. The term "user" used in various embodiments may refer to a person who uses an electronic device or a device (e.g., an artificial intelligence electronic device) that uses another electronic device.

FIG. 1 illustrates a network environment including an electronic device according to various embodiments of the present disclosure.

Referring to FIG. 1, the electronic device 101 may include a bus 110, a processor 120, a memory 130, an input/output interface 140, a display 150, a communication interface 160, and a notification service control module 170, but is not limited thereto.

The bus 110 may be a circuit to connect the above-described elements with each other and to transfer a communication (e.g., control messages) between the above-described elements.

The processor 120 may receive instructions from the above-described elements (e.g., the memory 130, the input/output interface 140, the display 150, the communication interface 160, the notification service control module 170, and the like) through, for example, the bus 110, may decode the received instructions, and perform calculation or data processing according to the decoded instructions.

The memory 130 may store instructions and/or data received from the processor 120 and/or other elements (e.g., the input/output interface 140, the display 150, the communication interface 160, the message management module 170, and the like) or generated by the processor 120 and/or other elements. The memory 130 may include programming modules such as, for example, a kernel 131, a middleware 132, an Application Programming Interface (API) 133, or applications 134. Each of the programming modules may be configured with software, firmware, hardware, or a combination thereof. The memory 130 may include at least some pieces of information related to application functions.

The kernel 131 may control or manage system resources (e.g., the bus 110, the processor 120, the memory 130, and the like) which are used in performing operations or functions implemented by other programming modules, for example the middleware 132, the API 133 or the applications 134. Further, the kernel 131 may provide interfaces by which the middleware 132, the API 133 or the applications 134 may access each element of the electronic device 101 for control or management.

The middleware 132 may play an intermediate role between the API 133 or the applications 134 and the kernel 131 to communicate with each other for transmission and reception of data. Further, in relation to requests for operation received from the applications 134, the middleware 132 may control (e.g., scheduling or load-balancing) the requests by, for example, determining priority for using system resources (e.g., the bus 110, the processor 120, the memory 130, and the like) of the electronic device 101 with respect to at least one of the applications 134.

The API 133 is an interface by which the applications 134 controls functions provided from the kernel 131 or the middleware 132, and may include, for example, at least one interface or function (e.g., instructions) for file control, window control, image processing, or text control.

According to various embodiments, the applications 134 may include a SMS/MMS application, an e-mail application, a calendar application, an alarm application, a health care application (e.g., an application for measuring the amount of exercise or blood sugar), an environmental information application (e.g., an application for providing atmospheric pressure, humidity, or temperature), and the like. Additionally or alternatively, the applications 134 may be an application related to the exchange of information between the electronic device 101 and external electronic devices (e.g., an electronic device 104). The information-exchange-related application may include, for example, a notification relay application for relaying specific information to the external electronic device, or a device management application for managing the external electronic device.

For example, the notification relay application may include a function of transferring notification information generated in other applications (e.g., the SMS/MMS application, the e-mail application, the health care application, or the environmental information application) of the electronic device 101 to an external electronic device (e.g., the electronic device 104). Additionally or alternatively, the notification relay application may receive notification information from the external electronic device (e.g., the electronic device 104) and provide the same to a user. The device management application may manage (e.g., install, delete, and/or update), for example, at least some functions (e.g., turning the external electronic device (or some elements thereof) on or off, or adjusting the brightness (or resolution) of a display) of the external electronic device (e.g., the electronic device 104) that communicates with the electronic device 101, applications performed in the external electronic device, or services (e.g., a phone call service, or a messaging service) provided in the external electronic device.

According to various embodiments, the applications 134 may include applications, which are designated according to the property (e.g., the type of electronic device) of the external electronic device (e.g., the electronic device 104). For example, if the external electronic device is an MP3 player, the applications 134 may include applications related to reproduction of music. Likewise, if the external electronic device is a mobile medical device, the applications 134 may include an application related to health care. According to an embodiment, the application 134 may include at least one of application designated in the electronic device 101 and/or applications received from external electronic devices (e.g., a server 106, or the electronic device 104).

The input/output interface 140 may transfer instructions or data input by a user through input/output devices (e.g., sensors, keyboards, or touch screens) to the processor 120, the memory 130, the communication interface 160, and/or the notification service control module 170 through, for example, the bus 110. For example, the input/output interface 140 may provide data on a user's touch input through a touch screen to the processor 120. For example, instructions and/or data received from the processor 120, the memory 130, the communication interface 160, and/or the notification service control module 170 through the bus 110 may be output through the input/output devices (e.g., speakers or displays). For example, the input/output interface 140 may output voice data processed by the processor 120 to a user through a speaker.

The display 150 may display various pieces of information (e.g., multimedia data, and/or text data) to a user.

The communication interface 160 may perform communication connection between the electronic device 101 and external electronic devices (e.g., the electronic device 104, and/or the server 106). For example, the communication interface 160 may be connected with a network 162 through wireless communication and/or wired communication to communicate with the external electronic device. The wireless communication may include at least one scheme of Wi-Fi, Bluetooth (BT), Near Field Communication (NFC), a Global Positioning System (GPS), and cellular communication (e.g., LTE, LTE-A, CDMA, WCDMA, UMTS, WiBro, or GSM). The wired communication may include at least one of a Universal Serial Bus (USB), a High Definition Multimedia Interface (HDMI), recommended standard 232 (RS-232), and a Plain Old Telephone Service (POTS).

According to an embodiment, the network 162 may be a telecommunication network. The communication network may include at least one of a computer network, the Internet, the Internet of things, and a telephone network, but is not limited thereto. According to an embodiment, protocols (a transport layer protocol, a data link layer protocol, and/or a physical layer protocol) for communication between the electronic device 101 and external electronic devices may be provided by at least one of the applications 134, the API 133, the middleware 132, the kernel 131, and/or the communication interface 160.

The notification service control module 170 may process at least some of the information obtained from other elements (e.g., the processor 120, the memory 130, the input/output interface 140, or the communication interface 160) and provide the same to a user in various manners. For example, the notification service control module 170 may control at least some functions of the electronic device 101 by using the processor 120 and/or independently so that the electronic device 101 may interwork with other electronic devices (e.g., the electronic device 104 and/or the server 106). Additional information on the notification service control module 170 may be provided with reference to FIGS. 2 to 12 described later.

Figure 2:
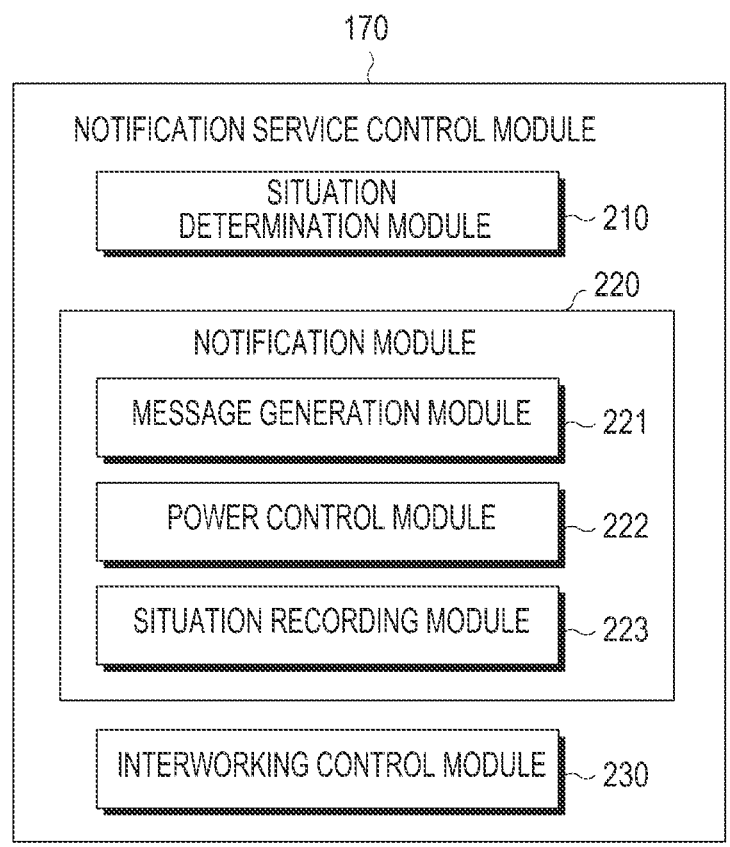
FIG. 2 is a block diagram of a notification service control module according to various embodiments of the present disclosure.

FIG. 2 is a block diagram of a notification service control module according to various embodiments of the present disclosure.

Referring to FIG. 2, the notification service control module may include a situation determination module 210, a notification module 220, and an interworking control module 230. The notification module 220 may include at least one of a message generation module 221, a power control module 222, and a situation recording module 223.

According to various embodiments of the present disclosure, the notification service control module 170 may obtain information on the emergency situation of a user through the electronic device 101. The notification service control module 170 may receive situation information from the outside, and/or may receive information on an emergency situation through sensors which are functionally connected with the electronic device 101 and detect a temperature, a sound, a fire, a fall, and the like.

According to various embodiments of the present disclosure, based on at least one piece of information obtained from the outside and/or information obtained from at least one sensor that is functionally connected to the electronic device 101, the controller (or processor 120) determines a designated situation and features related to the designated situation, and controls the electronic device 101 on the basis of at least one of the features and/or user status information. In addition, the controller may further include a sensor unit including at least one sensor for detecting the designated situation. The controller may determine the designated situation by using at least one of the type of the designated situation, the degree of the designated situation, and the duration of the designated situation. The controller may automatically configure emergency situation notification messages according to the degree of the designated situation. Also, the emergency situation notification message may be configured to be different in at least one of a transmission period, the number of times of transmission, a transmission frequency, a transmission time, and a transmission mode, and may include at least one of the latest contact information, a contacting frequency, a group, user-designated contact information, a user-designated group, and a rescue party close to the current location of a user. The controller may configure the emergency situation notification message by using at least one of a method for notifying of the designated situation, a configuration of a screen image, a menu configuration, an application control, and/or a request for help. The controller may adjust the security level and/or a display content of a locked screen of the electronic device 101 to be different. When an emergency situation is determined, the controller may notify of the designated situation to at least one of other users through a running application, and the at least one of other users may be determined by using at least one of the latest contact information, a contacting frequency, a group, user-designated contact information, a user-designated group, and a rescue party close to the current location of a user. The controller may control power consumption by activating a function necessary for notifying of the designated situation to at least one user.

According to various embodiments of the present disclosure, the situation determination module 210 may determine an emergency situation on the basis of at least one piece of information obtained from the outside or information obtained from at least one sensor that is functionally connected with the electronic device 101, and may determine the type or features of emergency situation. The situation determination module 110 may determine features such as the type of emergency situation, the type of hazard, the degree of hazard, the duration of hazard, and the like through the obtained information. The situation determination module 210 may determine an emergency situation. The situation determination module 210 may determine features of hazard through the obtained hazard information. Alternatively or additionally, the situation determination module 210 may determine an emergency situation on the basis of at least one piece of information obtained from the outside or information obtained from at least one sensor that is functionally connected with the electronic device 101. The situation determination module 210 may collect location information. The location information may be obtained through, for example, GPS or base stations (not shown).

According to various embodiments of the present disclosure, the notification module 220 may include at least one of a message generation module 221, a power control module 222, and a situation recording module 223. The notification module 220 may transmit emergency situation notification messages, which are generated to be different according to the degree of the emergency situation and/or modes, to the electronic device of at least one of other users in at least one different manner of a transmission period, the number of times of transmission, and a mode. When the electronic device 101 is in a warning mode, the notification module 220 may transmit an emergency situation notification message with a short period of transmission and a high frequency of transmission. The notification module 220 may transmit an emergency situation notification message to an electronic device of at least one of other users regardless of the above mode. The notification module 220 may automatically configure the emergency situation notification messages according to the degree of emergency situation and transmit the same to at least one of other users. The notification module 220 may transfer emergency situation notification messages, which are configured to be different from each other according to a mode or regardless of a mode. The emergency situation notification messages may be divided into pieces and transferred according to conditions of a network environment and/or configuration, and may be attached with pictures, voices, videos, and the like.

According to various embodiments of the present disclosure, the message generation module 221 may generate emergency situation notification messages corresponding to each mode of the electronic device 101. The generated emergency situation notification message may include different information depending on the mode. The message generation module 221 may configure emergency situation notification messages to be different depending on the degree of the emergency situation. The message generation module 221 may automatically configure emergency situation notification messages immediately after an emergency situation is determined. According to an embodiment of the present disclosure, the message generation module 221 may automatically configure emergency situation notification messages according to a method of controlling an electronic device in response to determination of an emergency situation. The message generation module 221 may configure emergency situation notification messages to be different according to a method of transferring emergency situation notification messages, at least one of other users who receive emergency situation notification messages, or the description of the emergency situation.

According to various embodiments of the present disclosure, the power control module 222 may control an electronic device in order to minimize power consumption thereof in an emergency situation. When a user is in an emergency situation due to a fall, the power control module 222 may convert an electronic device 101 to a low power mode in order to use the electronic device for a long time. In an emergency situation, the power control module 222 may convert most functions except for a function necessary for notifying of an emergency situation to at least one user to a deactivation state to thereby reduce power consumption.

The situation recording module 223 may store information on the emergency situation in the memory 130.

According to various embodiments of the present disclosure, the interworking control module 230 may control the interworking between the situation determination module 210 and the notification module 220 which belong to the notification service control module 170. The interworking control module 230 may control the interworking of the message generation module 221, the power control module 222, or the situation recording module 223. The interworking control module 240 may be configured to perform at least one operation of monitoring operation states of other applications installed in an auxiliary electronic device, and providing a warning message to a user in response to a request for deletion of at least one application.

Figure 3:
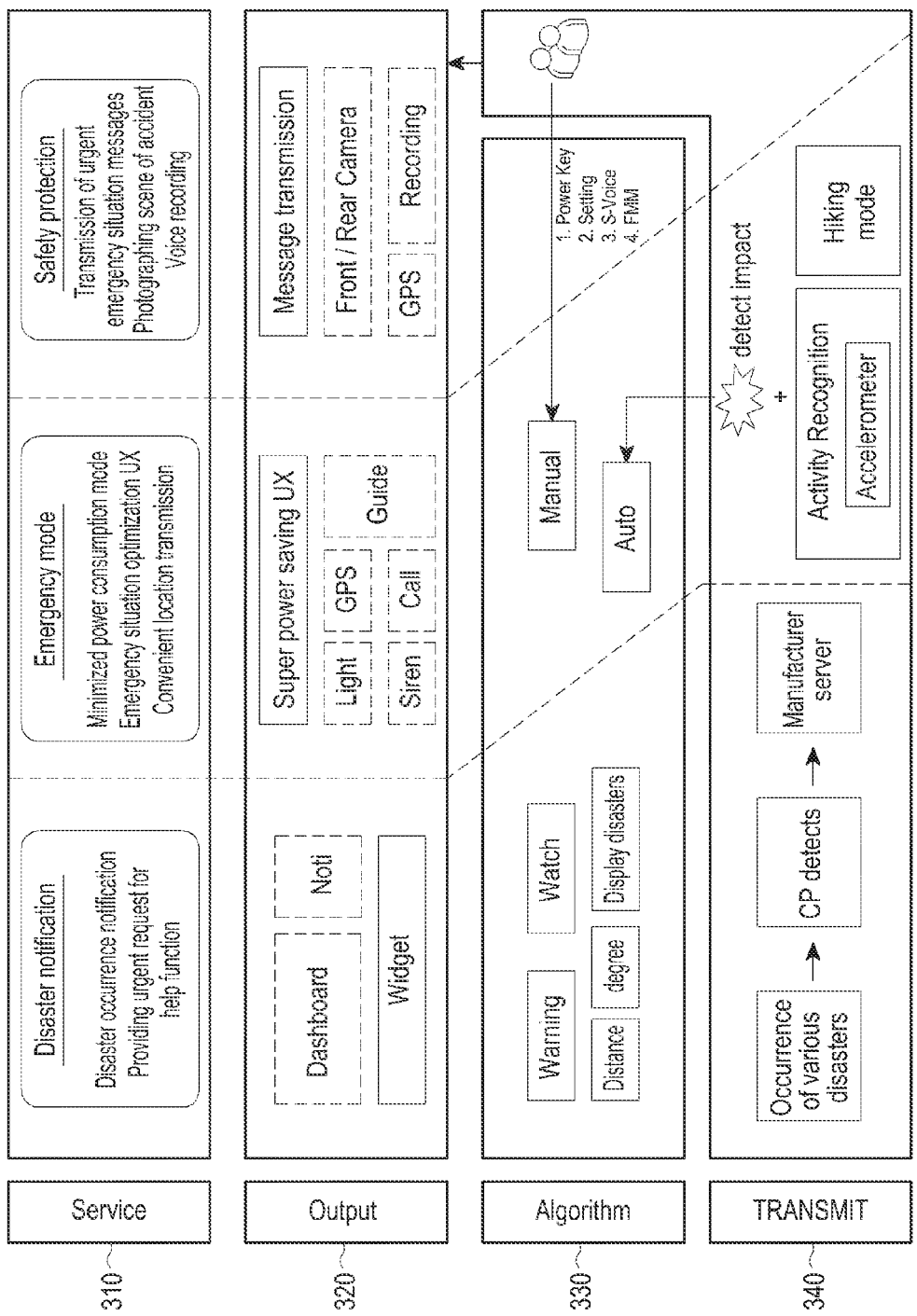
FIG. 3 is a block diagram illustrating a function of a notification service control module according to an embodiment of the present disclosure.

FIG. 3 is a block diagram illustrating a function of a notification service control module according to an embodiment of the present disclosure.

Referring to FIG. 3, an electronic device according to an embodiment of the present disclosure may obtain information by which a designated situation may be determined. According to various embodiments of the present disclosure, the designated situation may include emergency situations and/or emergency causes to a user. Such information may be obtained through at least one sensor provided in an electronic device. According to various embodiments of the present disclosure, the information may be obtained through sensors (e.g., gears) which are functionally connected with an electronic device, and/or external devices (e.g., servers, and the second electronic device). According to various embodiments of the present disclosure, an electronic device may receive the information by filtering the same in a device adopting at least one sensor, and/or in external devices. For example, in a case of earthquakes, the electronic device may be configured to receive only information on a magnitude more than 5.0 and an area within 100 km of the epicenter. The situation recording module 223 may store the information on the emergency situation in the memory 130.

According to various embodiments of the present disclosure, when such a situation is determined by the situation determination module 210, the notification service control module 170 may transfer information on the determined situation to the notification module 220. The notification module 220 may provide various services 310 in response to the situation determined by the situation determination module 210. The various services may include a disaster notification, an emergency mode, and/or safety protection. The various services may include notifying of disasters, requesting help, minimizing power consumption of an electronic device, transmitting messages of emergency situations, photographing the scene of a disaster, and/or recording voices in the disaster.

For example, the service of notifying of disasters may inform of the occurrence of disasters and provide a request for emergency help, and may be output 320 through various means such as a dashboard, a notice, a widget, and the like. In addition, the service of notifying of disasters may be output through various algorithms 330 such as a warning, a watch, a distance, a degree, and/or a disaster display, and the output information may be transmitted to a disaster notification server. The disaster notification server may transmit 340 the information to a server of the manufacturer of the electronic device. This disaster occurrence notification may be transmitted from the disaster notification server or the server of the manufacturer.

According to various embodiments of the present disclosure, an emergency mode refers to a mode in which power consumption of an electronic device is minimized, a user experience of an electronic device is optimized to be thereby provided, and current location information may be simply transmitted. The emergency mode may operate a display of an electronic device in a super power saving mode. According to various embodiments of the present disclosure, the emergency mode may activate functions necessary for minimizing a user's input, and activate minimum functions such as GPS, a siren, a phone call, a flash, and the like. In the emergency mode, an emergency situation may be detected by sensing a sudden impact, and/or through at least one sensor such as an acceleration sensor. The emergency mode may be activated by various pieces of information (voice, a key input).

Further, in the service of safety protection, an emergency message may be transmitted in an emergency situation, the scene of disaster may be photographed by at least one camera provided in an electronic device, or voices in the disaster may be recorded through a microphone.

Figure 4:
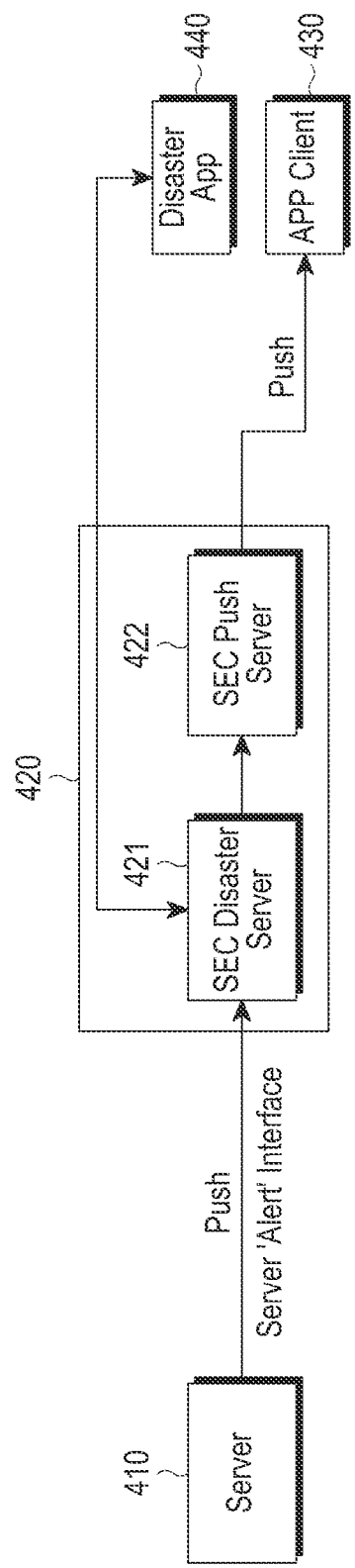
FIG. 4 is a diagram of a system in which an electronic device receives a message from a disaster information server according to an embodiment of the present disclosure.

FIG. 4 is a diagram of a system in which an electronic device receives a message from a disaster information server according to an embodiment of the present disclosure.

Referring to FIG. 4, a server 410 (e.g., CP) that provides information on disasters may transmit information to at least one server group 420 provided by a manufacturer of an electronic device, and at least one server 421 and 422 of the server group 420 may transmit disaster information to various applications 430 and 440 of an electronic device. According to various embodiments of the present disclosure, at least one server 421 and 422 of the server group 420 may collect the received information, and filter the collected information to thereby transmit the same to at least one electronic device that is provided with services from the manufacturer.

According to various embodiments of the present disclosure, the server 410 may transmit weather information to the disaster server 421 of the server group 420, and the disaster server 421 may provide the information to the push server 422. The push server 422 may transmit disaster information to the various applications 430 and 440 of an electronic device.

Figure 5:
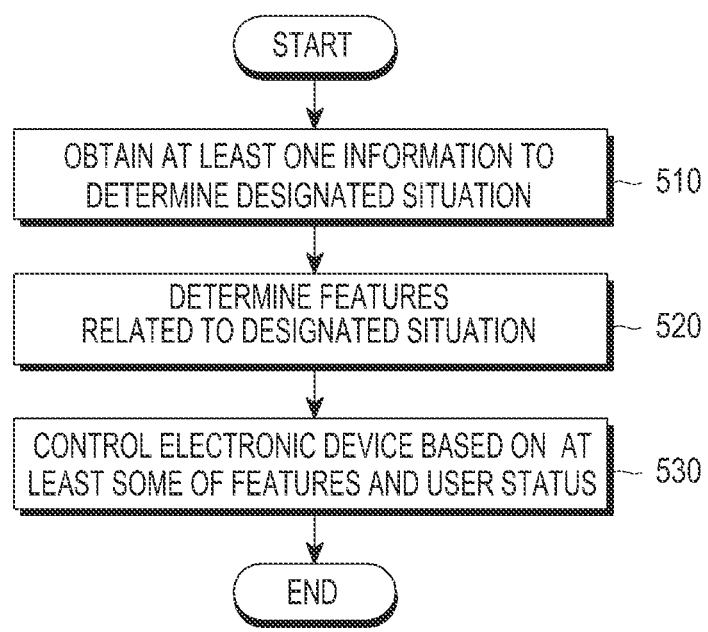
FIG. 5 is a flowchart illustrating operations of controlling an electronic device in a designated situation according to various embodiments of the present disclosure.

FIG. 5 is a flowchart illustrating operations of controlling a terminal according to various embodiments of the present disclosure.

Referring to FIG. 5, at least one piece of information may be obtained in order to determine a designated situation in operation 510. According to various embodiments of the present disclosure, the situation determination module 210 may determine the designated situation, based on at least one piece of information obtained from the outside or information obtained from at least one sensor that is functionally connected with the electronic device. According to various embodiments of the present disclosure, the situation may include various situations which endanger the safety of a user, such as emergency situations and/or disaster situations. The determination may be made by at least one of the type of designated situation, the degree of the designated situation, and the duration of the designated situation. The notification service control module 170 may obtain information on an emergency situation of a user through an electronic device 101. According to various embodiments of the present disclosure, the notification service control module 170 may receive information on an emergency situation from the outside and/or through sensors which are functionally connected with the electronic device and detect a temperature, a sound, a fire, a fall, and the like. These sensors may include at least one of a sensor for detecting a temperature, a sensor for detecting illuminance, a sensor for detecting a sound, a sensor for detecting an impact, a sensor for detecting an earthquake, a sensor for detecting a storm, a sensor for detecting a fall, and the like. The notification service control module 170 may obtain information on an emergency situation through various other sensors for detecting emergency situations as well as the above-described sensors.

According to an embodiment of the present disclosure, the electronic device (e.g., the electronic device 101) may perform an operation of determining features related to a designated situation in operation 520. According to various embodiments of the present disclosure, the situation determination module 210 may determine a designated situation (e.g., an emergency situation) or designated elements (e.g., emergency elements) on the basis of at least one piece of information obtained from the outside and/or information obtained from at least one sensor that is functionally connected with the electronic device, to thereby determine the type and/or features of the emergency situation. The situation determination module 210 may determine features such as the type of emergency situation, the type of hazard, the degree of hazard, the duration of hazard, and the like through the obtained information. The features related to the designated situation refer to situations which endanger a user, and may include some natural disasters. According to various embodiments of the present disclosure, the natural disasters may include at least one of earthquakes, storms, volcanic eruptions, floods, fires, falls and accidents. The following Table 1 shows information to determine emergency situations.

TABLE 1

Types

Earthquake Warning
Tsunami Warning
Active Wildfire Warning
Volcano Alert
Excessive Heat Warning
Extreme Cold Warning
Flood Warning
Typhoon Warning
Air Pollution Warning
Extreme Wind Warning
Ozone Warning
Storm Warning
Ash fall Warning
Dust Storm Warning
Severe Thunderstorm Watch
Avalanche Warning
Hurricane Warning
Tornado Warning
Gale Warning
High Wind Warning
Tropical Storm Warning According to various embodiments of the present disclosure, the Table 1 may include information on various other emergency situations as well as the above-described emergency situations, and may include the type of emergency situation, the type of hazard, the degree of hazard, and the duration of hazard. According to various embodiments of the present disclosure, the situation determination module 210 may determine the degree of emergency through the information. The information may be obtained through at least one sensor provided in an electronic device, sensors (e.g., a gear) that is functionally connected with the electronic device, and external devices (e.g., servers and the second electronic device). Further, the electronic device may receive the information that is filtered by at least one sensor or external devices.

According to various embodiments of the present disclosure, the electronic device may be controlled based on at least some features determined in the operation 520 and/or some pieces of user status information in operation 530. The operation 530 may include an operation of determining the degree of emergency of the designated situation to be different with respect to a user according to the user status information. The operation 530 may include an operation of classifying the degree of emergency of the designated situation, and an operation of controlling the electronic device according to the classified degree of emergency. According to various embodiments of the present disclosure, the operation 530 may include an operation of adjusting a security level or a display content of a locked screen of the electronic device. The operation 530 may include an operation of configuring emergency situation notification messages to be different in at least one of the description of emergency situation, receivers of emergency situation notification messages, and a method of transferring emergency situation notification messages, according to the degree of emergency, and transmitting the emergency situation notification messages. The operation of transmitting the emergency situation notification message may include an operation of configuring at least one of a transmission period, the number of times of transmission, a transmission frequency, transmission time, and a transmission mode to be different, and the emergency situation notification message may be determined by including the latest contact information, a contacting frequency, a group, user-designated contact information, a user-designated group, and/or a rescue party close to the current location of a user. The emergency situation notification message may be configured by using at least one of a method of notifying of a designated situation, a configuration of a screen image, a configuration of a menu, an application control, and a request for help. The operation 530 may include an operation of configuring emergency situation notification messages to be different in at least one of the description of emergency situation, receivers of emergency situation notification messages, and a method of transferring emergency situation notification messages, according to the degree of emergency to thereby transmit the emergency situation notification messages.

According to various embodiments of the present disclosure, the user status may be determined by using at least one of current location information of the electronic device, surrounding information, current time information, season information, hazard duration information, gender of a user, or user status information. According to an embodiment of the present disclosure, a controller may differently control the electronic device, based on at least some detected changes of user status information. The controller may determine the designated situation again, when the change of user status information is not detected for a predetermined time. According to various embodiments of the present disclosure, the controller may determine the degree of emergency by considering the type of emergency situation, the type of hazard, the degree of hazard, the duration of hazard, and the like. In addition, the controller may differently control the electronic device on the basis of the degree of emergency determined according to an emergency situation and user status information. According to an embodiment of the present disclosure, in the operation of controlling the electronic device on the basis of the determined features and the user status information, the electronic device 101 may be controlled to correspond to at least one of an emergency situation and user status information.

According to an embodiment of the present disclosure, modes of the electronic device may be controlled for at least one of a method of notifying a designated situation, a configuration of a screen image, a configuration of a menu, an application control, and a request for help. According to an embodiment of the present disclosure, the controller may change a security level of the electronic device 101 in response to the determined emergency situation, and the security level may be determined according to at least one of the emergency situation and the user status information. The controller may change information displayed in a screen in addition to the security level. For example, the controller may automatically generate a content displayed in a locked screen, and/or display a predetermined content therein.

According to an embodiment of the present disclosure, the controller may control the electronic device according to the determined degree of the emergency. In addition, the controller may operate the electronic device according to each function as well as the degree of emergency. For example, the controller may operate the electronic device in various modes such as a warning mode, a caution mode, and/or an attention mode according to the determined degree of emergency. According to an embodiment of the present disclosure, the message generation module 221 may generate emergency situation notification messages to correspond to the converted each mode. The generated emergency situation notification message may include different information according to the modes. According to an embodiment of the present disclosure, the message generation module 221 may configure emergency situation notification messages to be different according to the degree of emergency. For example, when the electronic device 101 enters a warning mode in a high level emergency situation, the emergency situation notification message may include at least one of a map showing the area of the an emergency situation, information on the emergency situation, information for preventing and avoiding the emergency situation, information on at least one of other users to be notified of the emergency situation of a user, information for a request for help, and information showing that the emergency situation has ended. According to an embodiment of the present disclosure, when the degree of emergency is between the warning mode and the attention mode, the electronic device 101 may be converted to a caution mode. According to an embodiment of the present disclosure, in the caution mode, the emergency situation notification message may include at least one of information on the emergency situation, news about the emergency situation, and information that urgently notifies the emergency situation. According to an embodiment of the present disclosure, the degree of emergency is less than the caution mode, the electronic device 101 may be converted to the attention mode. In the attention mode, the emergency situation notification message may include at least one of information on the emergency situation, and news about the emergency situation.

According to an embodiment of the present disclosure, the notification module 220 may configure the emergency situation notification message to be different in at least one of a transmission period, a transmission time, a transmission frequency, the number of times of transmission, and a transmission mode, and transmit the same to at least one electronic device of other users. For example, the notification module 220 may make the transmission period short and the transmission frequency high to thereby transmit the emergency situation notification message in a warning mode of the electronic device 101. According to an embodiment of the present disclosure, the notification module 220 may transmit the emergency situation notification message to at least one electronic device of other users regardless of the modes.

According to various embodiments of the present disclosure, the notification module 220 may automatically configure the emergency situation notification message according to the degree of the designated situation, and transmit the same to at least one of other users. The message generation module 221 may automatically generate the emergency situation notification message immediately after the emergency situation is determined. According to an embodiment of the present disclosure, the message generation module 221 may automatically configure the emergency situation notification message according to a method of controlling the electronic device in response to the determination of the emergency situation. According to an embodiment of the present disclosure, the controller may select and/or determine at least one of the latest contact information, a contacting frequency, a group, user-designated contact information, a user-designated group, and a rescue party close to the current location of a user, in order to select at least one of other users to receive the emergency situation notification message. According to an embodiment of the present disclosure, the message generation module 221 may configure the emergency situation notification messages to be different according to a method of transferring the emergency situation notification messages, at least one of other users who receive the emergency situation notification messages, and/or the description of the emergency situation. In addition, the notification module 220 may transmit the emergency situation notification messages configured to be different, according to the modes or regardless of the modes.

According to various embodiments of the present disclosure, the emergency situation notification message may be divided into pieces and transferred according to conditions of a network environment or configuration, and may be attached with pictures, voices, videos, and the like. According to an embodiment of the present disclosure, when feedback in response to transmission of the emergency situation notification message is not generated, the emergency situation notification message may be re-transmitted to another user. When re-transmitting the emergency situation notification message, the emergency situation notification message with a different configuration and content may be transmitted. According to an embodiment of the present disclosure, message receiver information may be scheduled in the order of emergency contact information, the latest contact information, and a designated group to be thereby transmitted. According to an embodiment of the present disclosure, if the degree of the emergency is re-determined, a configuration and/or a method of transmitting messages may be re-configured.

According to an embodiment of the present disclosure, the controller may identify a current running application in the electronic device 101 in order to transmit emergency situation notification messages to at least one of other users who are selected or determined. This application may include an application adopting a communication function to notify at least one of other users of an emergency situation. According to an embodiment of the present disclosure, the controller may notify at least one of other users of an emergency situation through a current running application. The application may include at least one of an application for transmitting and receiving text and/or voice information to and from at least one of the other users, and a communication module provided in the electronic device 101. The communication module may include a text messaging function, a group chatting function, and voice communication function. According to an embodiment of the present disclosure, the controller may notify at least one of other users of the emergency situation through at least one of Wi-Fi identifiers, Bluetooth identifiers, and NFC identifiers. According to various embodiments of the present disclosure, the controller may notify other users of the emergency situation through other identifiers according to various communication protocols for communication with external devices as well as the Wi-Fi, Bluetooth, and NFC.

According to an embodiment of the present disclosure, at least one of the notification service control module 170 and/or the processor 120 may determine a designated situation, based on at least one piece of information obtained from the outside or information obtained from at least one sensor that is functionally connected with the electronic device, determine features related to the designated situation, and control the electronic device on the basis of at least one of the features or user status information. The operation of determining the designated situation may be performed through at least one of the type of the designated situation, the degree of the designated situation, and the duration of the designated situation. The operation of controlling the electronic device may include an operation of determining the degree of emergency of the designated situation to be different according to the user status information. At least one of the notification service control module 170 and the processor 120 may determine whether a method for controlling the electronic device should be changed, based on at least some detected changes of user status information. At least one of the notification service control module 170 and the processor 120 may re-determine the designated situation, when the change of user status information is not detected at a predetermined time. The user status may be determined by using at least one of current location information of the electronic device, surrounding information, current time information, season information, hazard duration information, gender of a user, and user status information.

According to an embodiment of the present disclosure, the operation of controlling the electronic device may include an operation of classifying the degree of emergency of the designated situation, and an operation of controlling the electronic device according to the classified degree of emergency. The operation of controlling the electronic device may include an operation of configuring emergency situation notification messages to be different in at least one of the description of emergency situation, receivers of emergency situation notification messages, and a method of transferring emergency situation notification messages, according to the degree of emergency, and transmitting the emergency situation notification messages. The operation of transmitting the emergency situation notification message may include an operation of configuring at least one of a transmission period, the number of times of transmission, a transmission frequency, transmission time, and a transmission mode to be different, and the emergency situation notification message may be determined by including the latest contact information, a contacting frequency, a group, user-designated contact information, a user-designated group, and/or a rescue party close to the current location of a user. The emergency situation notification message may be configured by using at least one of a method of notifying the designated situation, a configuration of a screen image, a configuration of a menu, an application control, and a request for help. The operation of controlling the electronic device may include an operation of adjusting a security level and/or displaying content of a locked screen of the electronic device. The operation of controlling the electronic device may include an operation of notifying of the designated situation through a running application. The features related to the designated situation refer to situations which endanger the life or the safety of a user, and may include at least one of natural disasters and accidents.

According to an embodiment of the present disclosure, an operation of generating an identifier of the electronic device on the basis of at least one of the features or the user status information, and an operation of changing the generated identifier to correspond to the designated situation are further included.

Figure 6:
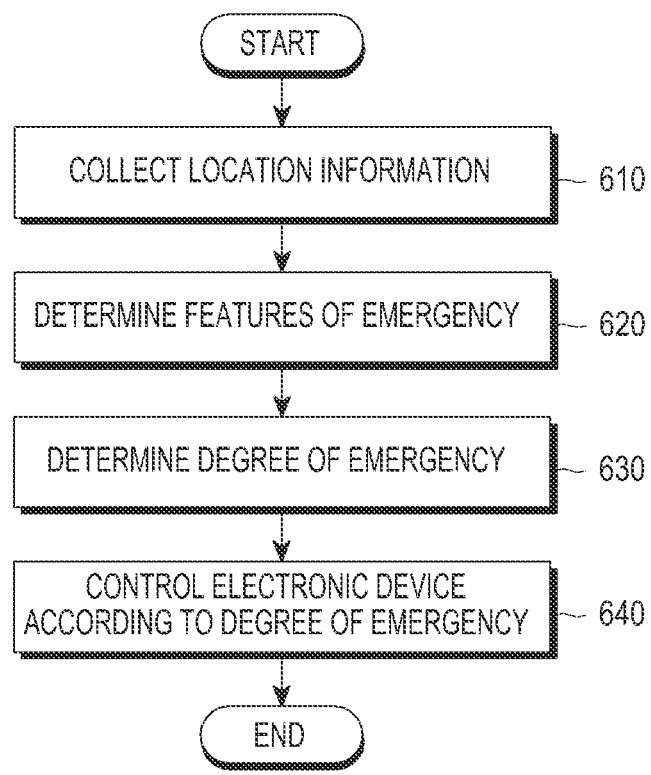
FIG. 6 is a flowchart illustrating a method for controlling an electronic device according to the location in an emergency situation according to various embodiments of the present disclosure.

FIG. 6 is a flowchart illustrating a method for controlling an electronic device according to the location in an emergency situation according to various embodiments of the present disclosure.

Referring to FIG. 6, according to an embodiment of the present disclosure, the situation determination module 210 may collect location information in operation 610. The location information may be obtained through, GPS or base stations (not shown). Further, the location information may be obtained in any operation among a plurality of operations shown in FIG. 6.

According to an embodiment of the present disclosure, the situation determination module 210 may determine an emergency situation in operation 620. For example, the situation determination module 210 may determine the emergency situation by using at least one of disaster notification messages, at least one sensor functionally connected with the electronic device, or hazard information received from at least one of other electronic devices. Alternatively or additionally, according to various embodiments of the present disclosure, the situation determination module 210 may determine the emergency situation, based on at least one piece of information obtained from the outside or information obtained from at least one sensor that is functionally connected with the electronic device. The situation determination module 210 may analyze causes of emergency situations.

According to various embodiments of the present disclosure, the situation determination module 210 may determine the degree of emergency at the current location in operation 630. The situation determination module 210 may determine information related to the current location of the electronic device 101 through a Point of Interest (POI), a GPS, and cell IDs. For example, the situation determination module 210 may re-determine the degree of emergency, when the change of location is detected. For example, the situation determination module 210 may re-determine the degree of emergency, when the change is not detected for a predetermined time. According to an embodiment of the present disclosure, the degree of emergency may be determined through at least one of information related to the current location of a user, current time, the wearing of other devices, the connection of other devices, duration of hazard, surrounding environmental information, gender of a user, age of a user, or a health status of a user. According to various embodiments of the present disclosure, the situation determination module 210 may determine the degree of emergency according to the degree by which the emergency situation affects a user. According to an embodiment of the present disclosure, the controller may convert the mode of the electronic device to a warning mode, a caution mode, or an attention mode according to the degree of emergency. According to an embodiment of the present disclosure, the message generation module 221 may configure the emergency situation notification messages according to the degree of emergency. According to an embodiment of the present disclosure, the notification module 220 may transmit the emergency situation notification messages configured to be different to at least one of other users. The at least one of other users may include at least one of the latest contact information, a contacting frequency, a group, a user-designated group, a rescue party close to the current location of the electronic device 101, or a rescue party of the corresponding nation. The at least one of other users may include various users who may help in an emergency situation by transmitting the emergency situation notification message as well as the above-described users.

According to an embodiment of the present disclosure, when feedback related to transmission of the emergency situation notification message is not generated, the emergency situation notification message may be re-transmitted to another user. When re-transmitting the emergency situation notification message, the emergency situation notification message with a different configuration and content may be transmitted. According to an embodiment of the present disclosure, message receiver information may be scheduled in the order of emergency contact information, the latest contact information, and a designated group to be thereby transmitted. According to an embodiment of the present disclosure, if the degree of emergency is re-determined, a configuration or a method of transmitting messages may be re-configured.

According to various embodiments of the present disclosure, the electronic device may be controlled according to the determined degree of emergency in operation 640. According to an embodiment of the present disclosure, the controller may control the electronic device 101 in response to the determined degree of emergency. According to an embodiment of the present disclosure, the controller may control the mode of electronic device for at least one of a notification of an emergency situation, a configuration of screen image, a control of a current running application, or a request for help in response to the determined degree of emergency. According to an embodiment of the present disclosure, the controller may change the security level of the electronic device 101 in response to the determined emergency situation, and the security level may be changed according to at least one of the emergency situations or user status information. The security level may be adjusted in a manner of, for example, locking finger prints→image locked screen→the state of nothing, or in a manner of shortening the length of a password or a pattern. For example, a password of five digits instead of ten digits may be required for the release. In addition, apart from the operation of adjusting the security level, information may be displayed in the locked screen. The displayed information may be predetermined by a user. Alternatively, some pieces of information among information stored in the terminal, such as user health information, and family contact information may be displayed.

According to an embodiment of the present disclosure, the controller may manage and control the electronic device in different modes according to the determined degree of emergency situation. According to an embodiment of the present disclosure, the controller may convert the electronic device to a warning mode, a caution mode, or an attention mode according to the degree of emergency. According to an embodiment of the present disclosure, the message generation module 221 may generate emergency situation notification messages corresponding to each of the converted modes. According to an embodiment of the present disclosure, the generated emergency situation notification messages may include different information according to the modes. The modes refer to different operations of the electronic device, and the mode may be variously named.

According to an embodiment of the present disclosure, the message generation module 221 may configure the emergency situation notification messages to be different information according to the degree of emergency situation. According to an embodiment of the present disclosure, the notification module 220 may transmit the emergency situation notification messages which are generated to be different according to the degree of emergency situation or modes to the electronic device of at least one of other users in at least one different manner of a transmission period, the number of times of transmission, or a mode. For example, when the electronic device 101 is in a warning mode, the controller may transmit the emergency situation notification message with a short period of transmission and a high frequency of transmission.

According to an embodiment of the present disclosure, the controller may automatically configure the emergency situation notification messages according to the degree of emergency situation and transmit the same to at least one of other users. According to an embodiment of the present disclosure, the message generation module 221 may automatically configure emergency situation notification messages immediately after an emergency situation is determined. According to an embodiment of the present disclosure, the controller may select or determine at least one of the latest contact information, a contacting frequency, a group, user-designated contact information, a user-designated group, or a rescue party close to the current location of a user, in order to select at least one of other users to receive the emergency situation notification message. The message generation module 221 may automatically configure emergency situation notification messages by using various pieces of information such as user hazard information, and rescue information, and may automatically configure emergency situation notification messages through information on the change of user status after accidents. The configuration of the emergency situation notification message will be described later with reference to FIGS. 7A to 7E. The emergency situation notification messages according to various embodiments of the present disclosure may include various pieces information by which at least one user in an emergency situation may be recognized as well as information disclosed in FIGS. 7A to 7E. In addition, the message generation module 221 may configure emergency situation notification messages through various pieces of information which are required to recognize emergency situations.

According to an embodiment of the present disclosure, the controller may identify a current running application in the electronic device 101 in order to transmit emergency situation notification messages to at least one of other users who are selected or determined. This application may include an application adopting a communication function to notify at least one of other users of an emergency situation. According to an embodiment of the present disclosure, the controller may notify at least one of the other users of an emergency situation through a current running application. The application may include at least one of an application for transmitting and receiving text or voice information to and from at least one of other users, and a communication module provided in the electronic device 101. The communication module may include a text messaging function, a group chatting function, and voice communication function, and the controller may notify at least one of other users of an emergency situation through Wi-Fi identifiers.

FIGS. 7A to 7E illustrate examples of screen images depending on the degree of emergency, according to various embodiments of the present disclosure.

Figure 7A:
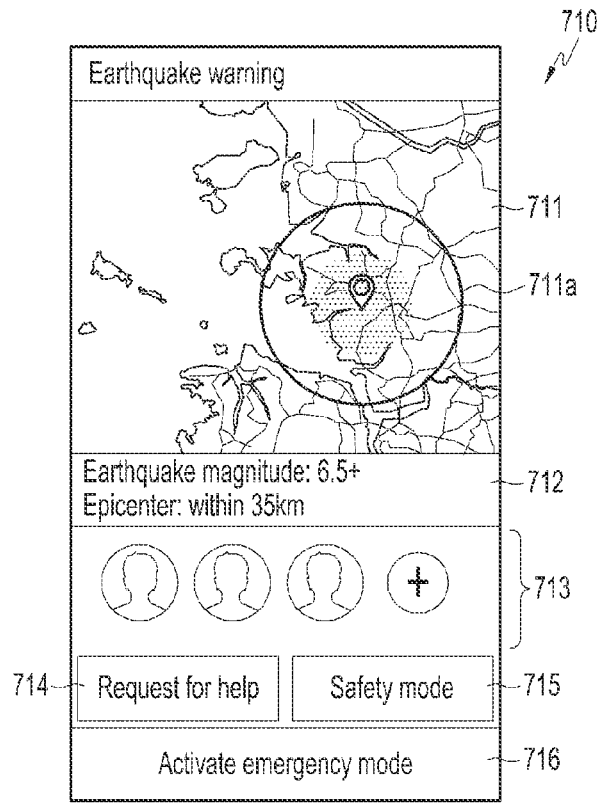
FIG. 7A illustrates an example of a designated situation message in a high degree of emergency according to various embodiments of the present disclosure.
Figure 7B:
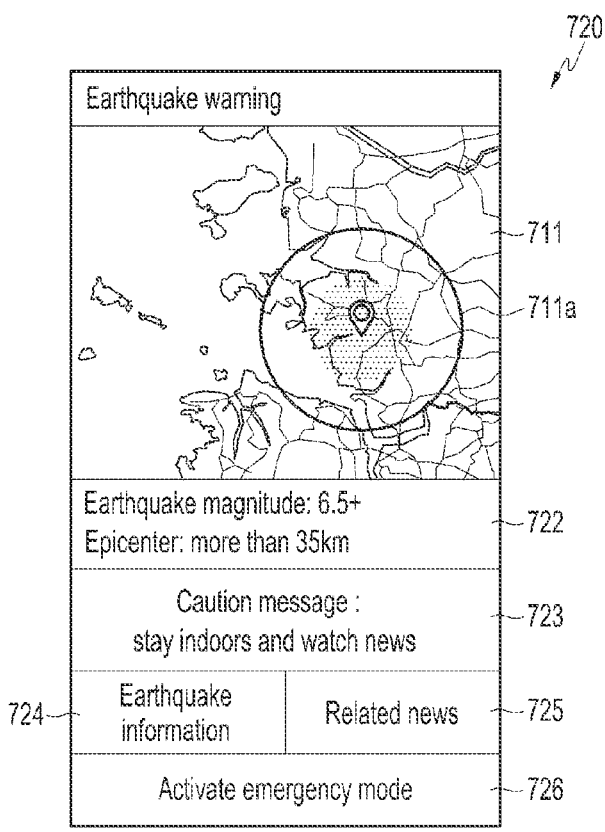
FIG. 7B illustrates an example of a designated situation message in a low degree of emergency according to various embodiments of the present disclosure.
Figure 7C:
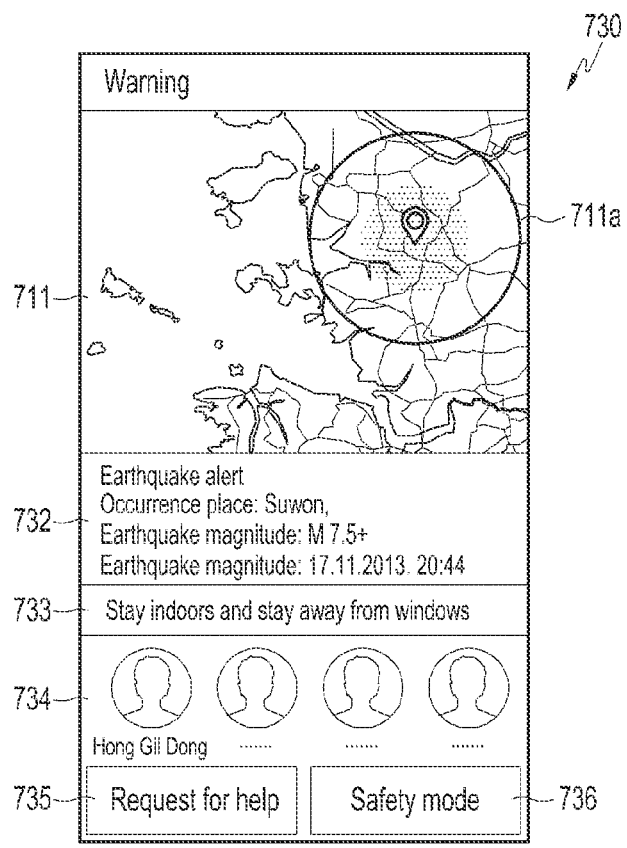
FIG. 7C illustrates an example of a designated situation message in a high degree of emergency according to another embodiment of the present disclosure.
Figure 7D:
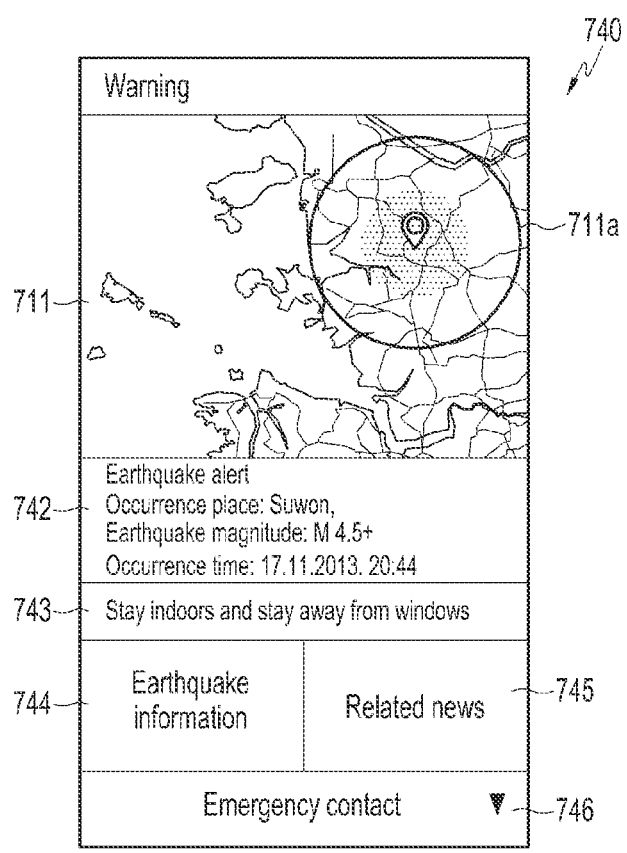
FIG. 7D illustrates an example of a designated situation message in a relatively low degree of emergency according to another embodiment of the present disclosure.
Figure 7E:
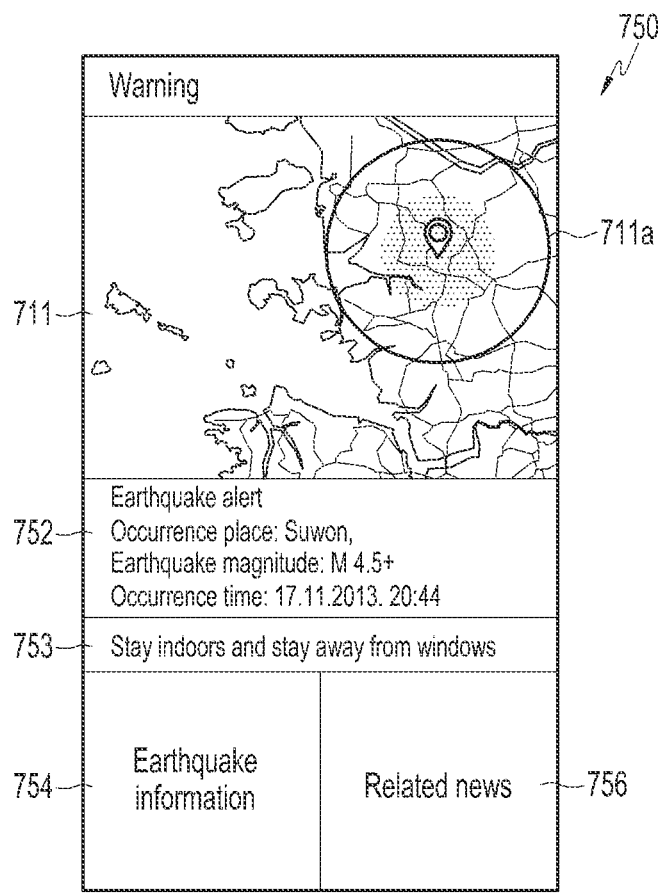
FIG. 7E illustrates an example of a designated situation message in the lowest degree of emergency according to another embodiment of the present disclosure.

In FIGS. 7A to 7E, FIG. 7A illustrates an example of a designated situation message in a high degree of emergency according to various embodiments of the present disclosure, FIG. 7B illustrates an example of a designated situation message in a low degree of emergency according to various embodiments of the present disclosure, FIG. 7C illustrates an example of a designated situation message in a high degree of emergency according to an embodiment of the present disclosure, FIG. 7D illustrates an example of a designated situation message in a relatively low degree of emergency according to an embodiment of the present disclosure, and FIG. 7E illustrates an example of a designated situation message in the lowest degree of emergency according to an embodiment of the present disclosure.

Referring to FIG. 7A, when an emergency situation (e.g., earthquakes) occurs according to an embodiment of the present disclosure, the controller may configure a screen 710 into several areas. According to an embodiment of the present disclosure, the first area 711 may display the location 711a where the emergency situation has occurred on the map. According to an embodiment of the present disclosure, the second area 712 may display more detailed information on the emergency situation. For example, the second area 712 may display a magnitude of earthquake, and a distance between the place where the earthquake has occurred and the current location of a user. According to an embodiment of the present disclosure, the third area 713 may display information on at least one of other users who are to be notified of an emergency situation, when a user is in the emergency situation. For example, when a user in an emergency situation searches for contact information stored in the electronic device, the third area 713 may display a contact list by which the user may identify emergency contact information, or frequently called telephone numbers first. If the contact list is accessed in an emergency situation, emergency contact information may be provided first. The at least one user may include at least one of the latest contact information, a contacting frequency, a group, a user-designated group, a rescue party close to the current location of a user, and a rescue party of the nation. The controller may configure related items first, when configuring an emergency mode. For example, in Japan where earthquakes frequently occur, the controller may configure items related to earthquakes first, when configuring an emergency mode. The at least one of other users may include various users who may help in an emergency situation by transmitting the emergency situation notification message as well as the above-described users. New users may be added, and/or existing users may be deleted. According to an embodiment of the present disclosure, the fourth area 714 may receive an instruction input for making a request to the at least one user for help. According to an embodiment of the present disclosure, the fifth area 715 may receive an instruction input for converting the electronic device 101 to a safety mode upon the termination of an emergency situation. According to an embodiment of the present disclosure, the electronic device 101 may operate in another level when the emergency situation terminates, and the level may be different according to the modes of the electronic device or the degree of emergency. In addition, the sixth area 716 may receive an instruction input for entering an emergency mode in response to the occurrence of an emergency situation. The emergency situation notification messages in a case of a high degree of emergency may include other information for notifying an emergency situation as well as the information shown in FIG. 7A.

Referring to FIG. 7B, according to an embodiment of the present disclosure, a user may determine that he or she is in a safe area because the location of occurrence of emergency situation is far from the user. According to an embodiment of the present disclosure, the electronic device 101 may convert the current mode to a caution mode for an emergency situation. According to an embodiment of the present disclosure, the controller may configure a screen 720 into several pieces. According to an embodiment of the present disclosure, the first area 711 may display the location 711a where the emergency situation has occurred on the map. According to an embodiment of the present disclosure, the second area 722 may display more detailed information on the emergency situation. For example, the second area 722 may display a magnitude of earthquake, and a distance between the place where the earthquake has occurred and the current location of a user. According to an embodiment of the present disclosure, the third area 723 may display an advisory message to allow a user to be informed of a current emergency situation and to watch the same. According to an embodiment of the present disclosure, the fourth area 724 may display more detailed information on the emergency situation. According to an embodiment of the present disclosure, the fifth area 725 may display information or news on the emergency situation which are provided from media sources, or may receive an instruction input for directions to related sites. According to an embodiment of the present disclosure, the fifth area 725 may display different information according to the current location of the electronic device 101. For example, in Japan where earthquakes frequently occur, a menu related to earthquakes may be provided first in the configuration image, and in Gangwon province, a region of heavy snows in Korea, information on snow may be provided first. According to an embodiment of the present disclosure, the sixth area 726 may receive an instruction input for entering an emergency mode in response to the occurrence of an emergency situation.

According to an embodiment of the present disclosure, the message generation module 221 may be converted to a warning mode or a caution mode according to an emergency situation, and may configure menus and the configuration of screen image to be different according to each mode. According to an embodiment of the present disclosure, the controller may differently operate the electronic device 101 even with the same menu.

According to an embodiment of the present disclosure, when an emergency situation and/or a hazard occurs, the electronic device 101 may detect the same, and receive related information through a communication interface 160, and/or obtain information on the emergency situation or the hazard cause through at least one sensor provided in a sensor unit of the electronic device 101. According to an embodiment of the present disclosure, the occurrence of hazard causes may be detected by receiving a push message with disaster information such as earthquakes, storms, and the like provided from a disaster server or by receiving disaster information from a server that provides the same.

According to an embodiment of the present disclosure, an emergency situation may be detected by a user converting the electronic device 101 to an emergency mode, and/or by hazard information received from other users. According to an embodiment of the present disclosure, the situation determination module 210 may determine the degree of emergency according to how much the hazard causes affect a user with consideration of the type of hazard cause, the location of the electronic device 101, and the like. According to an embodiment of the present disclosure, the situation determination module 210 may determine the degree of emergency according to user status information as well as the location of the electronic device, to thereby control the electronic device 101. According to various embodiments of the present disclosure, even with the same hazard cause, the degree of emergency may be different depending on the location of a user. For example, in a case of a fall, the degree of emergency from the fall in the mountains may be determined to be higher than that of a fall on level ground. For example, a fire in a factory full of flammable substances may be determined to be a high degree of emergency. Likewise, an accident detected on a highway may have a higher degree of emergency than an accident detected in an alley while walking. For example, when the electronic device is determined to be moved to the hospital after the detection of an accident of a high degree of emergency, the situation determination module 210 may recognize the user's movement to the hospital and reduce the degree of emergency even with the detection of the accident. Furthermore, for example, when a user who is staying in the area where an earthquake occurs leaves the area, the situation determination module 210 may reduce the degree of emergency. According to an embodiment of the present disclosure, the situation determination module 210 may newly configure and control the screen image in response to the determined degree of emergency.

Referring to FIG. 7C, when an emergency situation (e.g., earthquakes) occurs according to an embodiment of the present disclosure, the controller may divide a screen 730 into several areas. For example, the first area 711 may display the location 711a where the emergency situation has occurred on the map. The second area 732 may display more detailed information on the earthquake. For example, the second area 732 may display a magnitude of earthquake, a distance between the place where the earthquake has occurred and the current location of a user, or earthquake occurrence time. The third area 733 may display various pieces of information to effectively take action against the earthquake. For example, the sentence that asks users to stay indoors and away from windows may be displayed. The fourth area 734 may display information on at least one user who is to be notified of an emergency situation, when a user is in the emergency situation. The at least one user may include at least one of the latest contact information, a contacting frequency, a group, a user-designated group, and a rescue party close to the current location of a user, and new users may be added, and/or existing users may be deleted. The fifth area 735 may receive an instruction input for making a request to the at least one user for help. The sixth area 736 may receive an instruction input for converting the electronic device 101 to a safety mode upon the termination of an emergency situation.

Referring to FIG. 7D, when it is determined that a user is in a safe area because the location of occurrence of emergency situation is far from the current location of the user, the electronic device 101 may convert the current mode to a caution mode for an emergency situation. The controller may divide a screen 740 into several areas. The first area 711 may display the location 711a where the emergency situation has occurred on the map. The second area 742 may display more detailed information on the emergency situation. For example, the second area 742 may display a magnitude of earthquake, a distance between the place where the earthquake has occurred and the current location of a user, and/or earthquake occurrence time. The third area 743 may display messages to ask a user to watch the emergency situation. The fourth area 744 may display various pieces of information on the emergency situation. The fifth area 745 may display information and/or news on the emergency situation which are provided from media sources, or may receive an instruction input for direction to related sites. The sixth area 746 may receive an instruction input for selecting at least one user who may be urgently contacted in response to the emergency situation.

Referring to FIG. 7E, according to an embodiment of the present disclosure, when it is determined that a user is in a safe area because the location of occurrence of emergency situation is far from the current location of the user, the electronic device 101 may convert the current mode to a safety mode for an emergency situation. According to an embodiment of the present disclosure, the controller may divide a screen 750 into several areas. The first area 711 may display the location 711*a* where the emergency situation has occurred on the map. The second area 752 may display more detailed information on the emergency situation. For example, the second area 752 may display a magnitude of earthquake, a distance between the place where the earthquake has occurred and the current location of a user, and/or earthquake occurrence time. The third area 753 may display messages to ask a user to watch the emergency situation. The fourth area 754 may display various pieces of information on the generated earthquake. According to various embodiments of the present disclosure, the various pieces of information may include information related to the generated earthquake such as the generation of aftershocks, the generation period of aftershocks, and the like. The fifth area 756 may display information or news on the emergency situation which are provided from media sources, or may receive an instruction input for direction to related sites.

According to an embodiment of the present disclosure, the controller may switch the electronic device into a warning mode, a caution mode, or a safety mode depending on emergency situations to thereby control a screen according to each mode, and display information on each mode in the screen.

According to an embodiment of the present disclosure, when an emergency situation or a hazard cause occurs, the electronic device 101 may detect the same, and receive related information through a communication interface 160, and/or obtain information on the emergency situation or the hazard cause through at least one sensor provided in a sensor unit of the electronic device 101. The occurrence of hazard causes may be detected by receiving a push message with disaster information such as earthquakes, storms, and the like provided from a disaster server or by receiving disaster information from a server that provides the same.

According to an embodiment of the present disclosure, an emergency situation may be detected by a user converting the electronic device 101 to an emergency mode, and/or by hazard information received from other users. For example, the situation determination module 210 may determine the degree of emergency according to how much the hazard causes affect a user with consideration of the type of hazard cause, the location of the electronic device 101, and the like, and newly configure or control the screen image to correspond to the determined degree of emergency.

Figure 8A:
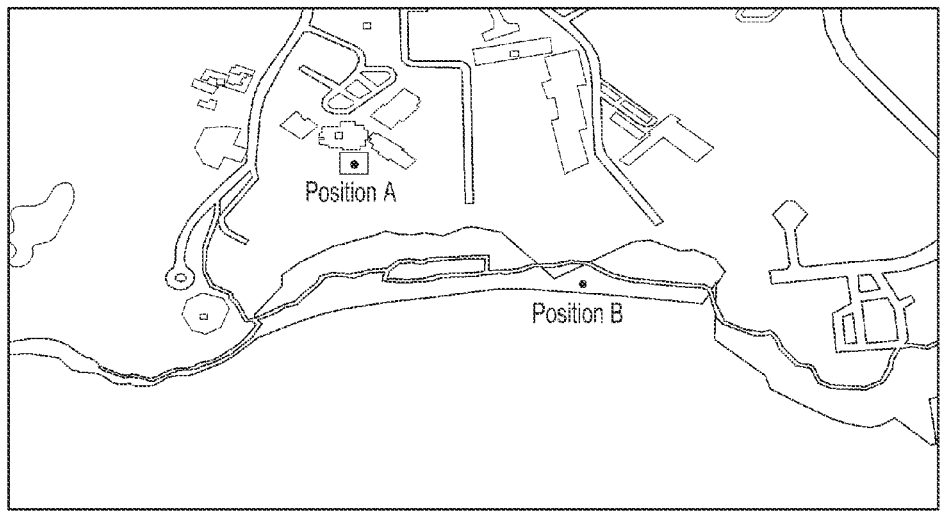
FIG. 8A illustrates an example of status information of different users in an emergency situation according to an embodiment of the present disclosure.
Figure 8B:
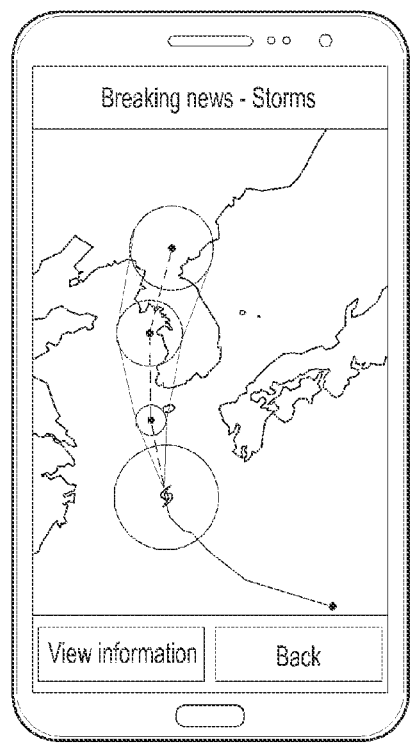
FIG. 8B illustrates an example of a control operation in a low degree of emergency according to an embodiment of the present disclosure.
Figure 8C:
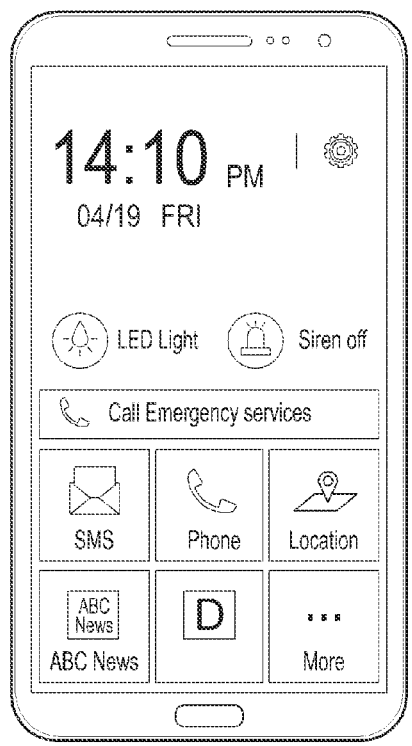
FIG. 8C illustrates an example of a control operation in a high degree of emergency according to an embodiment of the present disclosure.

FIGS. 8A to 8C illustrates examples of control operations according to user status information in an emergency situation according to an embodiment of the present disclosure.

Referring to FIG. 8A, an example of status information of different users in an emergency situation according to an embodiment of the present disclosure is illustrated. FIG. 8B illustrates an example of a control operation in a low degree of emergency according to an embodiment of the present disclosure. FIG. 8C illustrates an example of a control operation in a high degree of emergency according to an embodiment of the present disclosure.

Referring to FIG. 8A, when an emergency situation (e.g., storms) occurs according to an embodiment of the present disclosure, the controller may determine a current location. For example, when a user is determined to be at the position A (e.g., in the building), the controller may control to determine that the emergency situation (e.g., storms) has a low degree of emergency to thereby switch the electronic device 101 into a mode (e.g., a caution mode) corresponding to the low degree of emergency, and display the screen image as shown in FIG. 8B. According to an embodiment of the present disclosure, as shown in FIG. 8B, the map showing that a storm is moving from the southern sea to the inland area may be displayed to provide various pieces of information on the storm. According to an embodiment of the present disclosure, when a user is determined to be at the position B (e.g., on the seashore), the controller may control to determine that the emergency situation has a high degree of emergency to thereby convert the electronic device 101 to a warning mode, and display the screen image as shown in FIG. 8C. According to an embodiment of the present disclosure, as shown in FIGS. 8A to 8C, even with the detection of the same disaster, the degree of emergency may be different according to the current location of a user. For example, the degree of emergency in a case of a user staying in the hotel or building at the position A is lower than the degree of emergency in a case of a user being on the seashore at the position B, so the controller may convert the electronic device 101 at the position B to an emergency mode to thereby notify the user of the emergency situation, while the controller may convert the electronic device at the position A to a caution mode to ask the user not to go out.

According to various embodiments of the present disclosure, the power control module 222 may control the electronic device in order to minimize power consumption of the electronic device in an emergency situation. For example, in a case of an emergency situation such as a user's fall, the power control module 222 may convert the electronic device 101 to a low power mode in order to use the electronic device 101 for a long time. According to an embodiment of the present disclosure, in an emergency situation, the power control mode 222 may convert most functions except for a function necessary for notifying the emergency situation to at least one user to a deactivation state to thereby reduce power consumption. According to an embodiment of the present disclosure, the controller may convert a screen to an emergency mode and configure the same in an emergency situation (e.g., earthquakes). The controller may configure related items first, when configuring an emergency mode. For example, in Japan where earthquakes frequently occur, the controller may configure items related to earthquakes first, when configuring an emergency mode. The controller may display functions necessary for notifying at least one user of an emergency situation. These functions may include LEDs, a siren, transmission of location, a phone call, and/or earthquake guides. According to an embodiment of the present disclosure, the controller may activate at least one function among the functions automatically by checking the amount of remaining current of a power supply, or according to a user's selection.

FIGS. 9A to 9D illustrate an example of notifying at least one of other users in an emergency situation.

Figure 9A:
FIG. 9A illustrates an example of schedule information stored in an electronic device that detects an emergency situation according to an embodiment of the present disclosure.
Figures 9B, 9C, 9D:
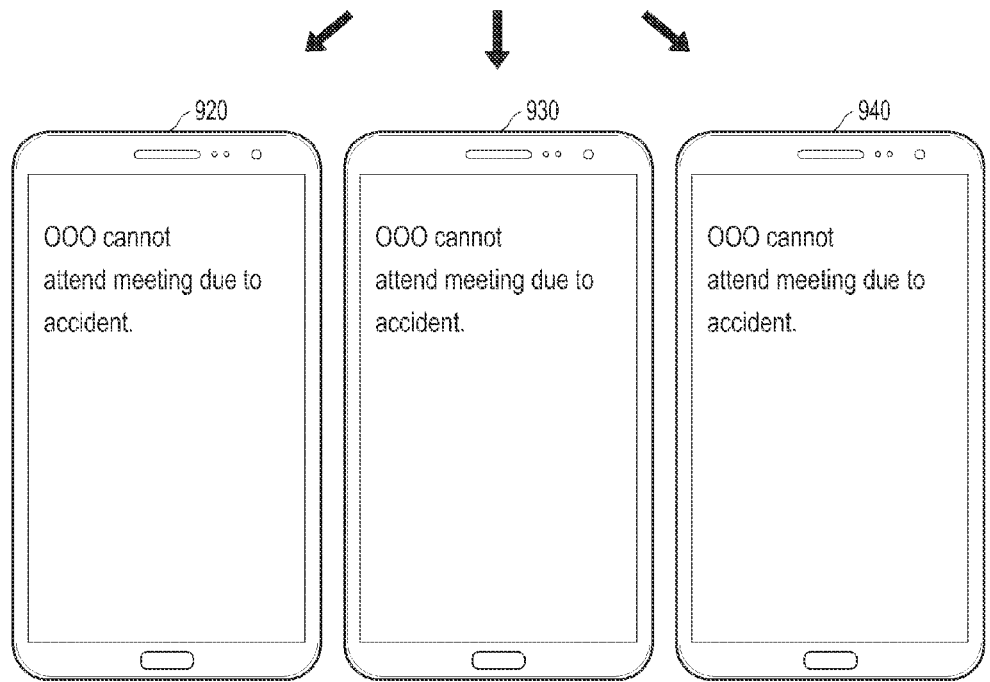
FIGS. 9B, 9C, and 9D illustrate an example of an emergency notification message transferred to electronic devices of which users have an appointment with a user of an electronic device that detects an emergency situation according to an embodiment of the present disclosure.

Referring to FIG. 9A, an example of schedule information stored in an electronic device that detects an emergency situation according to an embodiment of the present disclosure, and FIG. 9B to 9D illustrate an example of an emergency notification message transferred to electronic devices of which users have an appointment with a user of an electronic device that detects an emergency situation according to an embodiment of the present disclosure.

When a user of an electronic device 910 who is supposed to meet Hong Gil Dong, Kim Gap Soo, and Jack at 7:00 to 9:00 pm at Gangnam station cannot join the meeting due to occurrence of an emergency situation, the message generation module 221 of the electronic device 910 that detects the emergency situation may generate and transmit emergency situation notification messages stating that the user cannot attend the meeting due to occurrence of an emergency situation to electronic devices 920, 930 and 940 of Hong Gil Dong, Kim Gap soo, and Jack. According to an embodiment of the present disclosure, when an emergency situation occurs, the controller may recognize the emergency situation and check schedules stored in the memory 130 to determine whether the user has any appointment. According to an embodiment of the present disclosure, the message generation module 221 may identify contact information or identifiers of at least one of other users included in the schedules, and generate messages stating that the user cannot attend the meeting to be thereby transmitted. According to an embodiment of the present disclosure, when an unexpected accident to a user is detected, the controller may convert the mode of the electronic device 101 to an emergency mode. According to an embodiment of the present disclosure, related users registered in the schedules may be notified of the accident. For example, the notification may be made in various ways such as text messages, voice calls, schedule updating, and the like. According to an embodiment of the present disclosure, the transferred information may be various pieces of information such as notification of absences, notification of accident, a request for help, and the like.

Figure 10:
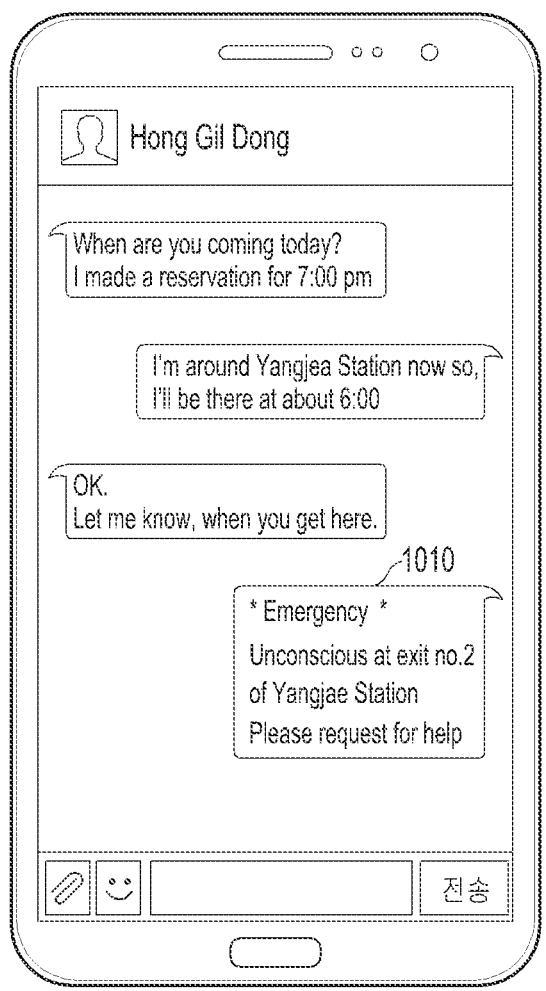
FIG. 10 illustrates an example of a notification message transferred to at least one of other users by using a running application in an emergency situation according to various embodiments of the present disclosure.

FIG. 10 illustrates an example of notifying at least one of other users by using an application that is being performed in an emergency situation according to various embodiments of the present disclosure.

According to an embodiment of the present disclosure, when an unexpected accident occurs to a user during one-to-one text messaging or one-to-several text messaging, the situation determination module 210 may detect the emergency situation. According to an embodiment of the present disclosure, the notification module 220 may transmit a content related to the emergency situation through a chat window that the user uses. For example, receivers may be determined by extracting the same from chat applications and/or e-mail applications. According to an embodiment of the present disclosure, the message generation module 221 may automatically generate emergency situation notification messages and transmit the emergency situation notification messages 1010 through the current running application. For example, the emergency situation notification messages may include a description of the accident, location of the accident, time of the accident, and the like. For example, when an emergency situation of a user due to a fall is detected while the user is transmitting and receiving text messages to and from at least one of other users by using a messenger program such as ChatOn, the controller may convert the electronic device 101 to an emergency mode, and notify other users who are chatting in the messenger program of the emergency situation of the user. For example, the at least one of other users may be determined by using at least one of the latest contact information, a contacting frequency, a group, and a user-designated group. For example, the emergency situation notification messages may be periodically transmitted to other users. According to an embodiment of the present disclosure, the situation determination module 210 may analyze the degree of emergency by determining whether the user in the emergency situation can move. In response to this, the emergency situation notification messages may be newly configured. According to an embodiment of the present disclosure, if the current running program is a navigation program for guiding paths, when a hazard cause that may affect a user occurs on the paths, the controller may change the paths. According to an embodiment of the present disclosure, the paths may be changed according to the changed hazard, and information such as schedule information and hazard information capable of affecting a user may be informed of, and/or re-scheduling is recommended.

Figure 11A:
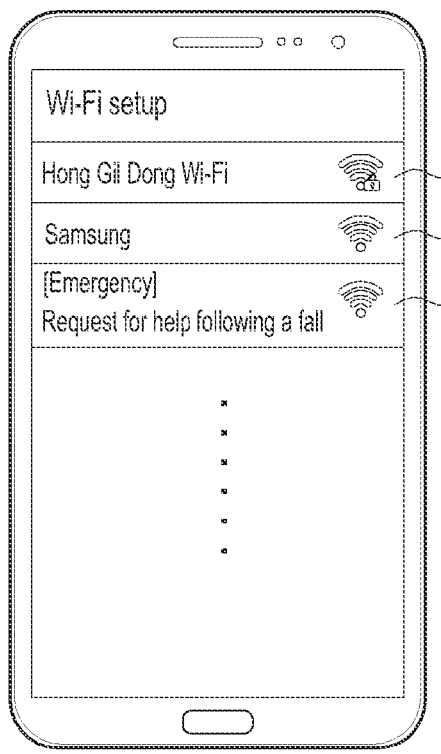
FIG. 11A illustrates an example of changing a Wi-Fi ID in an emergency situation according to another embodiment of the present disclosure.
Figure 11B:
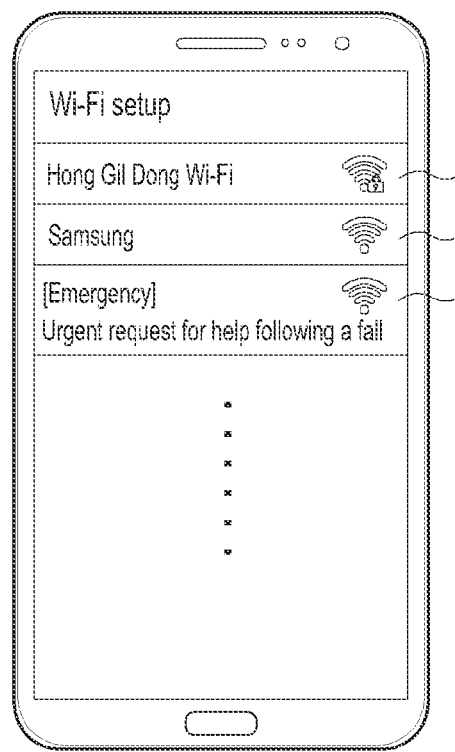
FIG. 11B illustrates an example of updating a Wi-Fi ID when appropriate actions have not been taken within a predetermined amount of time from the occurrence of an emergency situation according to another embodiment of the present disclosure.

FIGS. 11A and 11B illustrate an example of changing an identifier of a terminal and notifying at least one of other users in an emergency situation according to another embodiment of the present disclosure.

Referring to FIG. 11A, an example of changing a Wi-Fi ID in an emergency situation according to another embodiment of the present disclosure is illustrated, and FIG. 11B illustrates an example of updating a Wi-Fi ID when appropriate actions have not been taken until a predetermined amount of time has expired since occurrence of an emergency situation according to another embodiment of the present disclosure.

Referring to FIG. 11A, the electronic device 101 may include various IDs such as a Bluetooth ID, a Hotspot ID, a Wi-Fi ID, and the like. At least one electronic device 101 in the surrounding area may search for Wi-Fi signals and identify an identifier of the electronic device 101 to thereby display the same on a screen. According to various embodiments of the present disclosure, each Wi-Fi signal 1110 and/or 1120 may be displayed in the screen. When an emergency situation occurs, the situation determination module 210 may detect the emergency situation. The message generation module 221 may activate a Wi-Fi mode in order to notify at least one of other users of the detected emergency situation, and generate emergency situation notification messages to inform IDs of the activated Wi-Fi of the emergency situation. According to an embodiment of the present disclosure, the message generation module 221 may generate emergency situation notification messages to notify at least one of other users of the detected emergency situation, activate a Wi-Fi mode by using the generated emergency situation notification messages, and notify IDs of the activated Wi-Fi of the emergency situation. The controller may notify other users by replacing the generated emergency situation notification messages with an ID 1130 of Wi-Fi.

Referring to FIG. 11B, when the user stays motionless, or actions have not been taken for the emergency situation after replacing the emergency situation with the ID of Wi-Fi, the emergency situation notification message may be renewed to state that the user is currently in a very urgent emergency situation, to be thereby transmitted to another user. After changing the ID, a request for pairing may be made with respect to other terminals. According to an embodiment of the present disclosure, after pairing, various pieces of information may be transferred to another electronic device. For example, information such as an emergency situation of a user, and/or information for a request for help may be transferred to at least one of other electronic devices 1140. As the pairing continues to be made, information may be updated and transferred. This method of changing IDs may be utilized during communication interruption and/or when a low battery level is detected as well as in the emergency situation. In addition to the user's ID, an ID of at least one of other electronic devices may be changed through the pairing. The method of changing IDs may be applied to virtual IDs or real IDs, and the ID may be changed again according to the change of situation. When the emergency situation terminates and/or a user is moved to a safe area, the ID may return to the original ID.

Figure 12:
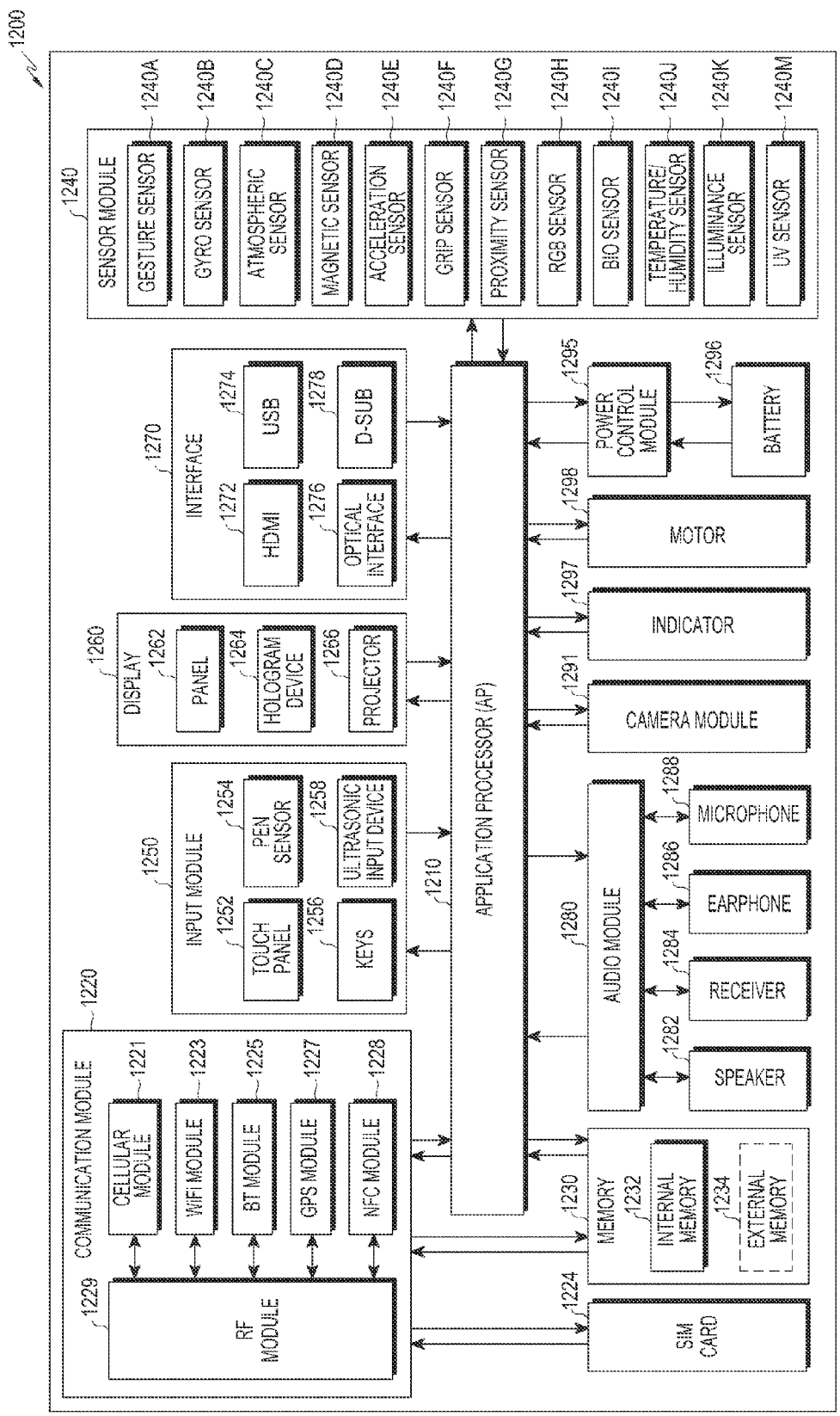
FIG. 12 is a block diagram illustrating an electronic device according to various embodiments of the present disclosure.

FIG. 12 is a block diagram of an electronic device according to various embodiments of the present disclosure.

Referring to FIG. 12, the electronic device may constitute a part or all of, for example, the electronic device 101 shown in FIG. 1. The electronic device 1200 may include at least one Application Processor (AP) 1210, a communication module 1220, a Subscriber Identification Module (SIM) card 1224, a memory 1230, a sensor module 1240, an input device 1250, a display module 1260, an interface 1270, an audio module 1280, a camera module 1291, a power management module 1295, a battery 1296, an indicator 1297, and a motor 1298, but is not limited thereto.

The AP 1210 may control a multitude of hardware and/or software elements connected with the AP 1210 and perform processing of various data including multimedia data and calculation by performing an operating system and/or application programs. The AP 1210 may be implemented with, for example, a System on Chip (SoC). According to an embodiment, the AP 1210 may further include a Graphic Processing Unit (GPU).

The communication module 1220 (e.g., the communication interface 160) may perform transmission and reception of data between the electronic device 1200 (e.g., the electronic device 101) and other electronic devices (e.g., the electronic device 104 or the server 106) connected with the electronic device 1200 through networks. According to an embodiment of the present disclosure, the communication module 1220 may include a cellular module 1221, a Wi-Fi module 1223, a BT module 1225, a GPS module 1227, an NFC module 1228, or Radio Frequency (RF) module 1229. The cellular module 1221 may provide services of voice calls, video calls, and text messages, and/or an Internet service through communication networks (e.g., LTE, LTE-A, CDMA, WCDMA, UMTS, WiBro, or GSM). For example, the cellular module 1221 may perform identification and authentication of electronic devices in communication networks by using subscriber identification modules (e.g., SIM cards 1224). According to an embodiment of the present disclosure, the cellular module 1221 may perform at least some of functions provided by the AP 1210. For example, the cellular module 1221 may perform at least some of multimedia control functions.

According to an embodiment of the present disclosure, the cellular module 1221 may include a Communication Processor (CP). In addition, the cellular module 1221 may be implemented by, for example, SoC. Although elements such as the cellular module 1221 (e.g., the communication processor), the memory 1230, or the power management module 1295 are illustrated separately from the AP 1210 in FIG. 12, according to an embodiment of the present disclosure, the AP 1210 may include at least some (e.g., the cellular module 1221) of the above-described elements.

According to an embodiment of the present disclosure, the AP 1210 and/or the cellular module 1221 (e.g., the communication processor) may load instructions or data received from at least one of non-volatile memories or other elements which are connected with the AP 1210 and cellular module 1221 to volatile memories and process the same. The AP 1210 or cellular module 1221 may store data that is received or generated from or by at least one of the elements in non-volatile memories.

Each of The Wi-Fi module 1223, the BT module 1225, the GPS module 1227, and the NFC module 1228 may include, for example, a processor for processing data transmitted and received through each module. Although the Wi-Fi module 1223, the BT module 1225, the GPS module 1227, or the NFC module 1228 are illustrated as separated blocks in FIG. 12, according to an embodiment of the present disclosure, at least some (e.g., two or more) of the Wi-Fi module 1223, the BT module 1225, the GPS module 1227, and the NFC module 1228 may be included in one Integrated Chip (IC) or one IC package. For example, at least some processors (e.g., the communication processor corresponding to the cellular module 1221, or a Wi-Fi processor corresponding to the Wi-Fi module 1223) corresponding to the Wi-Fi module 1223, the BT module 1225, the GPS module 1227, and the NFC module 1228 may be implemented by a single SoC.

The RF module 1229 may transmit and receive data, for example, RF signals. The RF module 1229, although not shown, may include, for example, transceivers, Power Amp Modules (PAMs), frequency filters, Low Noise Amplifiers (LNA), and the like. The RF module 1229 may further include components, for example, conductors or cables for transmitting and receiving electromagnetic waves through a free space in wireless communication. Although the cellular module 1221, the Wi-Fi module 1223, the BT module 1225, the GPS module 1227, and the NFC module 1228 share one RF module 1229 in FIG. 12, according to an embodiment of the present disclosure, at least one of the cellular module 1221, the Wi-Fi module 1223, the BT module 1225, the GPS module 1227, and the NFC module 1228 may transmit and receive RF signals through separated modules.

The SIM card 1224 may be a card adopting a subscriber identification module, and be inserted into a slot formed at a predetermined position of the electronic device. The SIM card 1224 may include an inherent identification information (e.g., an Integrated Circuit Card IDentifier (ICCID)) or subscriber information (e.g., an International Mobile Subscriber Identity (IMSI)).

The memory 1230 (e.g., the memory 130) may include an internal memory 1232 and an external memory 1234. The internal memory 1232 may include at least one of a volatile memory (e.g., a Dynamic RAM (DRAM), a Static RAM (SRAM), a Synchronous Dynamic RAM (SDRAM), and the like) and/or a non-volatile Memory (e.g., an one time programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like). According to an embodiment, the internal memory 1232 may be a Solid-State Drive (SSD) form. The external memory 1234 may further include a flash drive, for example, a Compact Flash (CF), a Secure Digital (SD), a Micro Secure Digital (Micro-SD), a Mini Secure Digital (Mini-SD), an extreme Digital (xD), a Memory Stick, and the like. The external memory 1234 may be functionally connected with the electronic device 1200 through various interfaces. According to an embodiment of the present disclosure, the electronic device 1200 may further include a storage device (or a storage medium) such as a hard drive.

The sensor module 1240 may measure physical quantities and detect an operation state of the electronic device, to thereby convert the measured or detected information to electric signals. The sensor module 1240 may include at least one of, for example, a gesture sensor 1240A, a gyro-sensor 1240B, an atmospheric sensor 1240C, a magnetic sensor 1240D, an acceleration sensor 1240E, a grip sensor 1240F, a proximity sensor 1240G, a color sensor 1240H (e.g., a Red-Green-Blue (RGB) sensor), a bio sensor 1240I, a temperature/humidity sensor 1240J, an illuminance sensor 1240K, or an Ultra Violet (UV) sensor 1240M, but is not limited thereto. Alternatively or additionally, the sensor module 1240 may further include an E-nose sensor (not shown), an ElectroMyoGraphy sensor (EMG) (not shown), an ElectroEncephaloGram sensor (EEG) (not shown), an ElectroCardioGram sensor (ECG) (not shown), an InfRared (IR) sensor (not shown), an iris sensor (not shown), or a fingerprint sensor (not shown), and the like. The sensor module 1240 may further include a control circuit for controlling at least one sensor included in the sensor module 1240.

The input device 1250 may include a touch panel 1252, a (digital) pen sensor 1254, keys 1256, and an ultrasonic input device 1258, but is not limited thereto. The touch panel 1252 may recognize a touch input by at least one of, for example, a capacitive type, a pressure type, an infrared type, and an ultrasonic type. In addition, the touch panel 1252 may further include a control circuit. In a case of a capacitive type, the proximity as well as direct touches may be detected. The touch panel 1252 may further include a tactile layer. In this case, the touch panel 1252 may provide a user with a tactile reaction.

According to various embodiments of the present disclosure, the (digital) pen sensor 1254 may be implemented by using, for example, a method that is the same as or similar to a user's touch input, or a separate recognition sheet. The keys 1256 may include, for example, physical buttons, optical keys, or a keypad. The ultrasonic input device 1258 detects acoustic waves with a microphone (e.g., a microphone 1288) at the electronic device 1200 through an input means that generates ultrasonic signals to thereby identify data. The ultrasonic input device 1258 may perform wireless recognition. According to an embodiment, the electronic device 1200 may receive a user input from external devices (e.g., computers, and/or servers) which are connected with the communication module 1230 by using the communication module 1230.

The display module 1260 (e.g., the display 150) may include a panel 1262, a hologram device 1264, or a projector 1266. The panel 1262 may be, for example, a Liquid Crystal Displays (LCD), an Active-Matrix Organic Light-Emitting Diode (AM-OLED), and the like. The panel 1262 may be implemented to be, for example, flexible, transparent or wearable. The panel 1262 may be configured with the touch panel 1252 as a single module. The hologram device 1264 may display 3D images in the air by using interference of light. The projector 1266 may display images by projecting light onto a screen. The screen may be positioned, for example, inside or outside the electronic device 1200. According to an embodiment, the display 1260 may further include a control circuit for controlling the panel 1262, the hologram device 1264, or the projector 1266.

The interface 1270 may include, for example, a High-Definition Multimedia Interface (HDMI) 1272, a Universal Serial Bus (USB) 1274, an optical interface 1276, or a D-subminiature (D-sub) 1278. The interface 1270 may be included in, for example, the communication interface 160 shown in FIG. 1. Additionally or alternatively, the interface 1270 may include, for example, a Mobile High-definition Link (MHL) interface, a Secure Digital (SD) card/Multi-Media Card (MMC) interface and/or an Infrared Data Association (IrDA) standard interface.

The audio module 1280 may convert voices to electric signals, and vice versa. At least some elements of the audio module 1280 may be included in, for example, the input/output interface 140 shown in FIG. 1. The audio module 1280 may process voice information input and/or output through, for example, a speaker 1282, a receiver 1284, an earphone 1286 and/or a microphone 1288.

The camera module 1291 is a device for photographing still and moving images, and may include at least one image sensor (e.g., a front sensor or a rear sensor), lenses (not shown), an Image Signal Processor (ISP) (not shown), and a flash (not shown) (e.g., LED or a xenon lamp) according to an embodiment.

The power control module 1295 may manage power of the electronic device 1200. Although not shown, the power management module 1295 may include, for example, a Power Management Integrated Circuit (PMIC), a charger IC, a battery and/or a fuel gauge.

The PMIC may be mounted, for example, in integrated circuits or SoC semiconductors. The charging methods may be divided into a wired type and a wireless type. The charger IC may charge a battery and prevent inflow of excessive voltage and/or excessive current from a charger. According to an embodiment, the charger IC may include a charger IC for at least one of the wired charging type and the wireless charging type. The wireless charging type may encompass, for example, a magnetic resonance type, a magnetic induction type and/or an electromagnetic wave type, and additional circuits for wireless charging, for example, coil loops, resonance circuits, rectifiers, and the like may be added.

The battery gauge may measure, for example, the remaining amount of battery 1296, a charging voltage and current, and/or temperature. The battery 1296 may store and/or generate electric power, and supply electric power to the electronic device 1200 by using the stored and/or generated power. The battery 1296 may be, for example, a rechargeable battery and/or a solar battery.

The indicator 1297 may display a specific state, for example, a booting state, a message state or a charging state of the whole or a part (e.g., the AP 1210) of the electronic device 1200. The motor 1298 may convert electric signals to a mechanical vibration. Although not shown, the electronic device 1200 may include a processing device (e.g., the GPU) for supporting a mobile TV. The processing device for supporting a mobile TV may process media data according to standards such as, for example, a Digital Multimedia Broadcasting (DMB), a Digital Video Broadcasting (DVB) and/or a media flow.

Each of the above-described elements of the electronic device according to the present disclosure may be configured with one or more components, and the names of the corresponding elements may depend on the type of electronic device. The electronic device according to the present disclosure may be configured by including at least one of the above-described elements, and some of the elements may be omitted, or other elements may be added. In addition, some of the elements of the electronic device according to the present disclosure may be combined to a single entity that may perform the same functions as those of original elements.

The term "module" used in the present disclosure may mean a unit including one or more combinations of, for example, hardware, software and firmware. The "module" may be replaced with terms such as, for example, a unit, a logic, a logical block, a component, and/or a circuit. The "module" may be a minimum unit or a part thereof which perform one or more functions. The "module" may be implemented mechanically and/or electronically. For example, the "module" may include at least one of Application-Specific Integrated Circuit (ASIC) chips, Field-Programmable Gate Arrays (FPGAs), or programmable-logic devices, which are well-known or will be developed in the future for performing predetermined operations.

According to various embodiments of the present disclosure, at least some of devices (e.g., modules or functions thereof) or methods (e.g., operations) according to the present disclosure may be implemented with instructions stored in computer-readable storage media, for example, as a form of programming module. When the instructions are performed by at least one processor (e.g., the processor 210), the at least one processor may perform functions corresponding to the instructions.

The computer-readable storage medium may be, for example, the memory 1230. At least some of the programming modules may be implemented (e.g., performed) by, for example, the processor 1210. At least some of the programming modules may include, for example, modules, programs, routines, sets of instructions and/or processes for performing at least one function. The computer-readable recording medium includes magnetic media such as hard disks, floppy disks and magnetic tapes, optical media such as a CD-ROM and a DVD, magneto-optical media such as floptical disks, and hardware devices such as a ROM, a RAM and a flash memory, which are specially configured to store and perform program instructions. Further, the program instruction includes a machine language code generated by a compiler and a high-level language code executable by a computer through an interpreter and the like. The hardware devices may be configured to operate as one or more software modules to perform the operations of the present disclosure, and vice versa.

The programming modules according to the present disclosure may include one or more elements among the above-described elements, exclude some of them, or further include other elements. Operations performed by the programming modules or other elements according to the present disclosure may be processed sequentially, concurrently, repeatedly or heuristically, and some operations may be omitted, or other operations may be added.

According to various embodiments of the present disclosure, in a recording medium for recording instructions performed by at least one processor to thereby allow the processor to perform at least one operation, the operation may include: determining a designated situation, based on at least one piece of information obtained from the outside or information obtained from at least one sensor of the electronic device, determining features corresponding to the designated situation, and controlling the electronic device, based on at least one of the features or user status information. The present disclosure may further include determining whether the control mode of the electronic device is to be changed, based on at least some detected changes of the user status information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling an electronic device, the method comprising:
   determining, by at least one processor of the electronic device, a designated situation corresponding to a current situation of the electronic device, based on at least one piece of information obtained from at least one sensor of the electronic device;
   determining, by the at least one processor, features corresponding to the designated situation;
   classifying, by the at least one processor, a degree of emergency of the designated situation based on the determined features; and
   differently controlling, by the at least one processor, an operation of the electronic device based on at least one of the features, user status information, and the degree of emergency of the designated situation.

2. The method of claim 1, further comprising determining, by the at least one processor, whether a control mode of the electronic device is to be changed, based on at least one detected change of the user status information.

3. The method of claim 1, further comprising re-determining, by the at least one processor, the designated situation if a change of the user status information is not detected for a predetermined amount of time.

4. The method of claim 1, wherein the designated situation is determined by using at least one of a type of the designated situation, the degree of the designated situation, and a duration of the designated situation.

5. The method of claim 1, wherein the differently controlling of the operation of the electronic device comprises determining the degree of emergency of the designated situation which affects a user to be different according to the user status information.

6. The method of claim 1, wherein a user status is determined by using at least one of current location information of the electronic device, surrounding information, current time information, season information, hazard duration information, gender of a user, or the user status information.

7. The method of claim 1, wherein the differently controlling the operation of the electronic device comprises transmitting an emergency situation notification message by controlling at least one of a description of the emergency situation notification message, receivers receiving the emergency situation notification message, or a method of transferring emergency situation notification message, according to the degree of emergency of the designated situation.

8. The method of claim 7,
   wherein the transmitting of the emergency situation notification message comprises configuring at least one of a transmission period, the number of times of transmission, a transmission frequency, transmission time, and a transmission mode to be different, and
   wherein the emergency situation notification message is determined by using at least one of the latest contact information, a contacting frequency, a group, user-designated contact information, a user-designated group, and a rescue party close to the current location of a user.

9. The method of claim 8, wherein the emergency situation notification message is configured by using at least one of a method for notifying the designated situation, a configuration of screen image, a menu configuration, an application control, or a request for help.

10. The method of claim 1, wherein one of a security level or a display content of a locked screen of the electronic device is adjusted to be different in the controlling the electronic device.

11. The method of claim 1, wherein the differently controlling the operation of the electronic device comprises notifying of the designated situation through a running application.

12. The method of claim 1, wherein the features corresponding to the designated situation refer to situations which one of endanger the life or the safety of a user, and include at least natural disasters and accidents.

13. The method of claim 1, further comprising:
generating, by the at least one processor, an identifier of the electronic device, based on at least one of the features and the user status information; and
changing, by the at least one processor, the generated identifier corresponding to the designated situation.

14. An electronic device comprising:
a memory configured to store at least one piece of information related to functions of applications; and
at least one processor configured to:
determine a designated situation corresponding to a current situation of the electronic device, based on at least one piece of information obtained from at least one sensor of the electronic device,
determine features corresponding to the designated situation,
classify a degree of emergency of the designated situation based on the determined features, and
differently control an operation of the electronic device; based on at least one of the features, user status information, and the degree of emergency on the designated situation.

15. The electronic device of claim 14, further comprising a sensor unit configured to include the at least one sensor for detecting the designated situation.

16. The electronic device of claim 14, wherein the at least one processor is further configured to control the designated situation by using at least one of a type of the designated situation, the degree of the designated situation, or a duration of the designated situation.

17. The electronic device of claim 14, wherein a user status is determined by using at least one of current location information of the electronic device, surrounding information, current time information, season information, hazard duration information, gender of a user, or the user status information.

18. The electronic device of claim 14,
wherein the at least one processor is further configured to automatically configure emergency situation notification message according to a degree of the designated situation,
wherein the emergency situation notification message is configured to be different in at least one of a transmission period, the number of times of transmission, a transmission frequency, transmission time, and a transmission mode, and
wherein the emergency situation notification message includes at least one of the latest contact information, a contacting frequency, a group, user-designated contact information, a user-designated group, or a rescue party close to the current location of a user.

19. The electronic device of claim 18, wherein the at least one processor is further configured to configure the emergency situation notification message by using at least one of a method for notifying the designated situation, a configuration of screen image, a menu configuration, an application control, or a request for help.

20. The electronic device of claim 14, wherein the at least one processor is further configured to adjust one of a security level and a display content of a locked screen of the electronic device to be different.

21. The electronic device of claim 14, wherein, if an emergency situation is determined, the at least one processor is further configured to notify at least one of other users of the designated situation through a running application, and the at least one of other users is determined through at least one of the latest contact information, a contacting frequency, a group, user-designated contact information, a user-designated group, or a rescue party close to the current location of a user.

22. The electronic device of claim 14, wherein the at least one processor is further configured to activate functions necessary for notifying at least one user of the designated situation to thereby control power consumption.

23. A non-transitory computer-readable recording medium for storing a program including instructions to be executed by one or more processors to control an electronic device, the medium comprising:
a first instruction set programmed to determine a designated situation corresponding to a current situation of the electronic device, based on at least one piece of information obtained from at least one sensor of the electronic device;
a second instruction set programmed to determine features corresponding to the designated situation;
a third instruction set programmed to classify a degree of emergency of the designated situation based on the determined features; and
a fourth instruction set programmed to differently control an operation of the electronic device based on at least one of the features, user status information, and the degree of emergency of the designated situation.

24. The non-transitory computer-readable recording medium of claim 23, further comprising a fifth instruction set programmed to determine whether a control mode of the electronic device is to be changed, based on at least one detected change of the user status information.

25. The non-transitory computer-readable recording medium of claim 23, wherein the user status information is determined by a motion sensor, the motion sensor measuring the user movement after a designated event in relation to the designated event.

* * * * *